United States Patent Office 3,341,484
Patented Sept. 12, 1967

3,341,484
VARNISHES PREPARED FROM NOVEL COPOLYMERS OF MONOEPOXY ALCOHOLS AND MONOEPOXIDES
Kenneth L. Hoy, St. Albans, W. Va., assignor to Union Carbide Corporation, a corporation of New York
No Drawing. Filed May 19, 1964, Ser. No. 368,704
14 Claims. (Cl. 260—18)

This invention relates to novel polyhydric copolymers and coating compositions prepared therefrom. In one aspect, this invention relates to the preparation of novel polyhydric copolymers which result from the polymerization of monoepoxy alcohol compounds with certain vicinal monoepoxide comonomers. In another aspect, the invention relates to novel drying and non-drying coating compositions which result from the reaction of the abovesaid polyhydric copolymers and an aliphatic monocarboxylic acid.

The novel polyhydric copolymers which are obtained in accordance with the teachings herein disclosed have extraordinary and outstanding utility as a component in the preparation of drying and non-drying coating compositions. These polyhydric copolymers are prepared by polymerizing a monoepoxy alcohol compound, or a mixture of monoepoxy alcohol compounds with certain other monoepoxides in the presence of various catalysts, as will be explained hereinafter. The reaction of said polyhydric copolymers with aliphatic monocarboxylic acids yields novel coating compositions which have excellent solubility in various inexpensive solvents, and which have a myriad of useful and unexpected characteristics. It has been observed that the novel coating compositions when cured exhibit, for example, excellent water, caustic and chemical resistance; excellent adhesion, toughness, and flexibility; excellent color stability and outstanding retention of gloss upon exposure to light and weathering; and/or extraordinary hardness as indicated by Sward values of upward to about 60, and greater, as compared to values of less than 40 for films prepared from commercial drying oil compositions.

In contrast to coating compositions prepared from homopolymers of the monoepoxy alcohol compounds and aliphatic carboxylic acids, it has been found that the use of the copolymers of the instant invention allows a wide degree of latitude in the final properties of the product. For example, the copolymeric products themselves can be prepared ranging from high melting solids to compositions having substantially lower melting points. Additionally, the copolymers of this invention have improved solubility characteristics over the homopolymers which render them suitable for diverse applications.

Accordingly, it is an object of this invention to provide novel polyhydric copolymers and novel coating compositions prepared therefrom. Another object of this invention is to provide novel polyhydric copolymers which result from the polymerization of monoepoxy alcohol compounds with various monoepoxide comonomers. A further object is to provide novel drying and non-drying coating compositions by the reaction of novel copolymers with aliphatic monocarboxylic acids. A still further object of this invention is to provide novel polyhydric copolymers which result from the polymerization of 4-oxatetracyclo[6.2.1.0$^{2,7}$.0$^{3,5}$]undecan-9-ol and a lower alkylene oxide. Another object is to provide novel copolymers which result from the polymerization of 4-oxatetracyclo[6.2.1.0$^{2,7}$.0$^{3,5}$]undecan-9-ol and propylene oxide. These and other objects will readily become apparent to those skilled in the art in the light of teachings herein set forth.

In a broad aspect, the polyhydric copolymeric products which are contemplated for use in the preparation of the novel drying and non-drying coating compositions are obtained by the polymerization of a single monoepoxy alcohol compound, or a mixture of monoepoxy alcohol compounds with a second monoepoxide as hereinafter defined. The monoepoxy alcohol compounds are characterized in that they are free of ethylenic, acetylenic, and benzenoid unsaturation, they contain a single oxirane oxygen atom bonded to vicinal cycloaliphatic carbon atoms, and they contain at least one alcoholic hydroxy group. It should be noted that the term "alcoholic hydroxy group," as used herein including the appended claims, refers to a hydroxy radical (—OH) which is monovalently bonded to an aliphatic or cycloaliphatic carbon atom. Those saturated monoepoxy alcohol compounds which contain solely carbon, hydrogen, and oxygen atoms are preferred.

Illustrative monoepoxy alcohol compounds which are contemplated for use as the first component in the preparation of the novel polyhydroxy-containing copolymers include:

(a) 4-oxatetracyclo[6.2.1.0$^{2,7}$.0$^{3,5}$]undecan-9-ol,
(b) 4-oxatetracyclo[6.2.1.$^{2,7}$.0$^{3,5}$]undec-9-oxyalkanol,
(c) 4-oxatetracyclo[6.2.1.0$^{2,7}$.0$^{3,5}$]undec-9-oxyalkane-poly-ol,
(d) 4-oxatetracyclo[6.2.1.0$^{2,7}$.0$^{3,5}$]undecane-9,10-diol,
(e) 4-oxatetracyclo[6.2.1.0$^{2,7}$.0$^{3,5}$]undecane-10,11-diol,
(f) 10-oxapentacyclo[6.3.1.1$^{3,6}$.0$^{2,7}$.0$^{9,11}$]tridecan-4-ol,
(g) 10-oxapentacyclo[6.3.1.1$^{3,6}$.0$^{2,7}$.0$^{9,11}$]tridecane-4,5-diol,
(h) 10-oxapentacyclo[6.3.1.1$^{3,6}$.0$^{2,7}$.0$^{9,11}$]tridec-4-ylalkanol,
(i) 10-oxapentacyclo[6.3.1.1$^{3,6}$.0$^{2,7}$.0$^{9,11}$]tridec-4,5-ylenedialkanol,
(j) 10-oxapentacyclo[6.3.1.1$^{3,6}$.0$^{2,7}$.0$^{9,11}$]tridec-4-oxyalkanol,
(k) 10-oxapentacyclo[6.3.1.1$^{3,6}$.0$^{2,7}$.0$^{9,11}$]tridec-4-oxyalkanepoly-ol,
(l) 10-oxapentacyclo[6.3.1.1$^{3,6}$.0$^{2,7}$.0$^{9,11}$]tridec-4-ylmethyleneoxyalkanol,
(m) 10-oxapentacyclo[6.3.1.1$^{3,6}$.0$^{2,7}$.0$^{9,11}$]tridec-4-ylmethyleneoxyalkane-poly-ol,
(n) the 4-oxatetracyclo[6.2.1.0$^{2,7}$.0$^{3,5}$]undec-9-oxy(mono- and polyalkyleneoxy)alkanols, which results from the monoepoxidation of the reaction products of tricyclo[5.2.1.0$^{2,6}$]dec-3-en-8-ol with a saturated aliphatic mono vicinal-epoxyhydrocarbon,
(o) the 4-oxatetracyclo[6.2.1.0$^{2,7}$.0$^{3,5}$]undec-9,10-ylene-di[oxy(mono- and polyalkyleneoxy)alkanols] which result from the monoepoxidation of the reaction products of tricyclo[5.2.1.0$^{2,6}$]dec-3-ene-8,9-diol with a saturated aliphatic mono vicinal-epoxyhydrocarbon,
(p) the 4-oxatetracyclo[6.2.1.0$^{2,7}$.0$^{3,5}$]undec-10,11-ylene-di[oxy(mono- and polyalkyleneoxy)alkanols] which result from the monoepoxidation of the reaction products of tricyclo[5.2.1.0$^{2,6}$]dec-3-ene-9-10-diol with a saturated aliphatic mono vicinal-epoxyhydrocarbon,
(q) the 10-oxapentacyclo[6.3.1.1$^{3,6}$.0$^{2,7}$.0$^{9,11}$]tridec-4-oxy(mono- and polyalkyleneoxy)alkanols which result from the monoepoxidation of the reaction products of tetracyclo[6.2.1.1$^{3,6}$.0$^{2,7}$]dodec-9-en-4-ol with a saturated aliphatic mono vicinal-epoxyhydrocarbon,
(r) the 10-oxapentacyclo[6.3.1.1$^{3,6}$.0$^{2,7}$.0$^{9,11}$]tridec-4,5-ylene-di[oxy(mono- and polyalkyleneoxy)alkanols] which result from the monoepoxidation of the reaction products of tetracyclo[6.2.1.1$^{3,6}$.0$^{2,7}$]dodec-9-ene-4,5-diol with a saturated aliphatic mono vicinal-epoxyhydrocarbon,
(s) 10-oxapentacyclo[6.3.1.1$^{3,6}$.0$^{2,7}$.0$^{9,11}$]tridec-4-ylalkyleneoxyalkanol,
(t) the 10-oxapentacyclo[6.3.1.1$^{3,6}$.0$^{2,7}$.0$^{9,11}$]tridec-4-ylalkyleneoxy(mono- and polyalkyleneoxy)alkanols which result from the monoepoxidation of the reaction products of tetracyclo[6.2.1.1$^{3,6}$.0$^{2,7}$]dodec-9-en-4-yl-alkanol with a saturated aliphatic mono vicinal-epoxyhydrocarbon, (u) 10 - oxapentacyclo[6.3.1.1$^{3,6}$.0$^{2,7}$.0$^{9,11}$]tridec - 4,5 - yl-ene-di(alkyleneoxyalkanol), and (v) the 10-oxapentacyclo[6.3.1.1$^{3,6}$.0$^{2,7}$.0$^{9,11}$]tridec-4,5-yl-ene-di[alkyleneoxy(mono- and polyalkyleneoxy) alkanols] which result from the monoepoxidation of the reaction products of tetracyclo[6.2.1.1$^{3,6}$.0$^{2,7}$]dodec-9-en-4,5-ylene-dialkanol with a saturated aliphatic mono vicinal-epoxyhydrocarbon.

Specific examples of the 4-oxatetracyclo[6.2.1.0$^{2,7}$.0$^{3,5}$]undec-9-oxyalkanols include for instance:

4-oxatetracyclo[6.2.1.0$^{2,7}$.0$^{3,5}$]undec-9-oxy-n-pentanol,
4-oxatetracyclo[6.2.1.0$^{2,7}$.0$^{3,5}$]undec-9-oxyethanol,
4-oxatetracyclo[6.2.1.0$^{2,7}$.0$^{3,5}$]undec-9-oxo-n-propanol,
4-oxatetracyclo[6.2.1.0$^{2,7}$.0$^{3,5}$]undec-9-oxyisopropanol,
4-oxatetracyclo[6.2.1.0$^{2,7}$.0$^{3,5}$]undec-9-oxy-n-butanol,
4-oxatetracyclo[6.2.1.0$^{2,7}$.0$^{3,5}$]undec-9-oxyisobutanol,
4-oxatetracyclo[6.2.1.0$^{2,7}$.0$^{3,5}$]undec-9-oxy-t-butanol,
4-oxatetracyclo[6.2.1.0$^{2,7}$.0$^{3,5}$]undec-9-oxy-n-hexanol,
4-oxatetracyclo[6.2.1.0$^{2,7}$.0$^{3,5}$]undec-9-oxy-n-octanol,
4-oxatetracyclo[6.2.1.0$^{2,7}$.0$^{3,5}$]undec-9-oxy-n-decanol, and the like.

Illustrative examples of the 4-oxatetracyclo[6.2.1.0$^{2,7}$.0$^{3,5}$]undec-9-oxyalkane-poly-ols which are contemplated include, for instance, the 4-oxatetracyclo[6.2.1.0$^{2,7}$.0$^{3,5}$]undec-9-oxyalkanediols, e.g.:

the 4-oxatetracyclo[6.2.1.0$^{2,7}$.0$^{3,5}$]undec-9-oxypropanediols,
the 4-oxatetracyclo[6.2.1.0$^{2,7}$.0$^{3,5}$]undec-9-oxybutanediols,
the 4-oxatetracyclo[6.2.1.0$^{2,7}$.0$^{3,5}$]undec-9-oxypentanediols,
the 4-oxatetracyclo[6.2.1.0$^{2,7}$.0$^{3,5}$]undec-9-oxyhexanediols, and the like; the 4-oxatetracyclo[6.2.1.0$^{2,7}$.0$^{3,5}$]undec-9-oxyalkanetriols, e.g.:

the 4-oxatetracyclo[6.2.1.0$^{2,7}$.0$^{3,5}$]undec-9-oxybutanetriols,
the 4-oxatetracyclo[6.2.1.0$^{2,7}$.0$^{3,5}$]undec-9-oxypentanetriols,
the 4-oxatetracyclo[6.2.1.0$^{2,7}$.0$^{3,5}$]undec-9-oxyhexanetriols,
the 4-oxatetracyclo[6.2.1.0$^{2,7}$.0$^{3,5}$]undec-9-oxyoctanetriols, and the like; the 4-oxatetracyclo[6.2.1.0$^{2,7}$.0$^{3,5}$]undec-9-oxyalkanetetrols, e.g.: the 4-oxatetracyclo[6.2.1.0$^{2,7}$.0$^{3,5}$]undec-9-oxyhexanetetrols, and the like; the 4-oxatetracyclo[6.2.1.0$^{2,7}$.0$^{3,5}$]undec-9-oxyalkanepentals, and the like.

Typical 10 - oxapentacyclo[6.3.1.1$^{3,6}$.0$^{2,7}$.0$^{9,11}$]tridec-4-ylalkanols include, among others:

10-oxapentacyclo[6.3.1.1$^{3,6}$.0$^{2,7}$.0$^{9,11}$]tridec-4-ylmethanol,
10-oxapentacyclo[6.3.1.1$^{3,6}$.0$^{2,7}$.0$^{9,11}$]tridec-4-ylethanol,
10-oxapentacyclo[6.3.1.1$^{3,6}$.0$^{2,7}$.0$^{9,11}$]tridec-4-yl-n-propanol,
10-oxapentacyclo[6.3.1.1$^{3,6}$.0$^{2,7}$.0$^{9,11}$]tridec-4-ylisopropanol,
10-oxapentacyclo[6.3.1.1$^{3,6}$.0$^{2,7}$.0$^{9,11}$]tridec-4-yl-n-butanol,
10-oxapentacyclo[6.3.1.1$^{3,6}$.0$^{2,7}$.0$^{9,11}$]tridec-4-yl-t-butanol,
10-oxapentacyclo[6.3.1.1$^{3,6}$.0$^{2,7}$.0$^{9,11}$]tridec-4-ylisobutanol,
10-oxapentacyclo[6.3.1.1$^{3,6}$.0$^{2,7}$.0$^{9,11}$]tridec-4-ylisohexanol,
10-oxapentacyclo[6.3.1.1$^{3,6}$.0$^{2,7}$.0$^{9,11}$]tridec-4-yl-n-octan-2-ol,
10-oxapentacyclo[6.3.1.1$^{3,6}$.0$^{2,7}$.0$^{9,11}$]tridec-4-yl-n-decanol, and the like.

Among the 10-oxapentacyclo[6.3.1.1$^{3,6}$.0$^{2,7}$.0$^{9,11}$]tridec-4-oxyalkanols are illustrative compounds such as:

10-oxapentacyclo[6.3.1.1$^{3,6}$.0$^{2,7}$.0$^{9,11}$]tridec-4-oxy-n-pentanol,
10-oxapentacyclo[6.3.1.1$^{3,6}$.0$^{2,7}$.0$^{9,11}$]tridec-4-oxyethanol,
10-oxapentacyclo[6.3.1.1$^{3,6}$.0$^{2,7}$.0$^{9,11}$]tridec-4-oxy-n-propanol,
10-oxapentacyclo[6.3.1.1$^{3,6}$.0$^{2,7}$.0$^{9,11}$]tridec-4-oxyisopropanol,
10-oxapentacyclo[6.3.1.1$^{3,6}$.0$^{2,7}$.0$^{9,11}$]tridec-4-oxy-n-butanol,
10-oxapentacyclo[6.3.1.1$^{3,6}$.0$^{2,7}$.0$^{9,11}$]tridec-4-oxyisobutanol,
10-oxapentacyclo[6.3.1.1$^{3,6}$.0$^{2,7}$.0$^{9,11}$]tridec-4-oxy-t-butanol,
10-oxapentacyclo[6.3.1.1$^{3,6}$.0$^{2,7}$.0$^{9,11}$]tridec-4-oxy-n-hexanol,
10-oxapentacyclo[6.3.1.1$^{3,6}$.0$^{2,7}$.0$^{9,11}$]tridec-4-oxy-n-octan-4-ol,
10-oxapentacyclo[6.3.1.1$^{3,6}$.0$^{2,7}$.0$^{9,11}$]tridec-4-oxy-n-dodecanol, and the like.

Illustrative 10-oxapentacyclo[6.3.1.1$^{3,6}$.0$^{2,7}$.0$^{9,11}$]tridec-4-oxyalkane-poly-ols include, for instance, the 10-oxapentacyclo[6.3.1.1$^{3,6}$.0$^{2,7}$.0$^{9,11}$]tridec-4-oxyalkanediols, e.g.:

the 10-oxapentacyclo[6.3.1.1$^{3,6}$.0$^{2,7}$.0$^{9,11}$]tridec-4-oxypropanediols,
the 10-oxapentacyclo[6.3.1.1$^{3,6}$.0$^{2,7}$.0$^{9,11}$]tridec-4-oxybutanediols,
the 10-oxapentacyclo[6.3.1.1$^{3,6}$.0$^{2,7}$.0$^{9,11}$]tridec-4-oxypentanediols,
the 10-oxapentacyclo[6.3.1.1$^{3,6}$.0$^{2,7}$.0$^{9,11}$]tridec-4-oxyhexanediols, and the like; the 10-oxapentacyclo[6.3.1.1$^{3,6}$.0$^{2,7}$.0$^{9,11}$]tridec-4-oxyalkanetriols, e.g.:

the 10-oxapentacyclo[6.3.1.1$^{3,6}$.0$^{2,7}$.0$^{9,11}$]tridec-4-oxybutanetriols,
the 10-oxapentacyclo[6.3.1.1$^{3,6}$.0$^{2,7}$.0$^{9,11}$]tridec-4-oxypentanetriols,
the 10-oxapentacyclo[6.3.1.1$^{3,6}$.0$^{2,7}$.0$^{9,11}$]tridec-4-oxyhexanetriols,
the 10-oxapentacyclo[6.3.1.1$^{3,6}$.0$^{2,7}$.0$^{9,11}$]tridec-4-oxyoctanetriols,
the 10-oxapentacyclo[6.3.1.1$^{3,6}$.0$^{2,7}$.0$^{9,11}$]tridec-4-oxynonanetriols, and the like: the 10-oxapentacyclo[6.3.1.1$^{3,6}$.0$^{2,7}$.0$^{9,11}$]tridec-4-oxyalkanetetrols, e.g.: the 10-oxapentacyclo[6.3.1.1$^{3,6}$.0$^{2,7}$.0$^{9,11}$]tridec-4-oxyhexanetetrols, and the like; the 10 - oxapentacyclo[6.3.1.1$^{3,6}$.0$^{2,7}$.0$^{9,11}$]tridec-4-oxyalkanepentols, and the like.

Typical 10 - oxapentacyclo[6.3.1.1$^{3,6}$.0$^{2,7}$.0$^{9,11}$]tridec-4-ylmethyleneoxyalkanols include, among others:

10-oxapentacyclo[6.3.1.1$^{3,6}$.0$^{2,7}$.0$^{9,11}$]tridec-4-ylmethyleneoxy-n-pentanol,
10-oxapentacyclo[6.3.1.1$^{3,6}$.0$^{2,7}$.0$^{9,11}$]tridec-4-ylmethyleneoxyethanol,
10-oxapentacyclo[6.3.1.1$^{3,6}$.0$^{2,7}$.0$^{9,11}$]tridec-4-ylmethyleneoxy-n-propanol,
10-oxapentacyclo[6.3.1.1$^{3,6}$.0$^{2,7}$.0$^{9,11}$]tridec-4-ylmethyleneoxyisopropanol,
10-oxapentacyclo[6.3.1.1$^{3,6}$.0$^{2,7}$.0$^{9,11}$]tridec-4-ylmethyleneoxy-n-butanol,
10-oxapentacyclo[6.3.1.1$^{3,6}$.0$^{2,7}$.0$^{9,11}$]tridec-4-ylmethyleneoxy-t-butanol,
10-oxapentacyclo[6.3.1.1$^{3,6}$.0$^{2,7}$.0$^{9,11}$]tridec-4-ylmethyleneoxy-n-hexanol,
10-oxapentacyclo[6.3.1.1$^{3,6}$.0$^{2,7}$.0$^{9,11}$]tridec-4-ylmethyleneoxy-n-octanol,
10-oxapentacyclo[6.3.1.1$^{3,6}$.0$^{2,7}$.0$^{9,11}$]tridec-4-ylmethyleneoxy-n-dodecanol, and the like.

Illustrative 10 - oxapentacyclo[6.3.1.1³,⁶.0²,⁷.0⁹,¹¹]-tridec-4-ylmethyleneoxyalkane-poly-ols which are contemplated include, for instance, the 10-oxapentacyclo[6.3.1.1³,⁶.0²,⁷.0⁹,¹¹]tridec - 4 - ylmethyleneoxyalkanediols, e.g.:

the 10-oxapentacyclo[6.3.1.1³,⁶.0²,⁷.0⁹,¹¹]tridec-4-ylmethylene-oxypropanediols,
the 10-oxapentacyclo[6.3.1.1³,⁶.0²,⁷.0⁹,¹¹]tridec-4-ylmethylene-oxybutanediols,
the 10-oxapentacyclo[6.3.1.1³,⁶.0²,⁷.0⁹,¹¹]tridec-4-ylmethylene-oxypentanediols,
the 10-oxapentacyclo[6.3.1.1³,⁶.0²,⁷.0⁹,¹¹]tridec-4-ylmethylene-oxyhexanediols,
the 10-oxapentacyclo[6.3.1.1³,⁶.0²,⁷.0⁹,¹¹]tridec-4-ylmethylene-oxyoctanediols, and the like;
the 10-oxapentacyclo[6.3.1.1³,⁶.0²,⁷.0⁹,¹¹]tridec-4-ylmethylene-oxyalkanetriols, e.g.,
the 10-oxapentacyclo[6.3.1.1³,⁶.0²,⁷.0⁹,¹¹]tridec-4-ylmethylene-oxybutanetriols,
the 10-oxapentacyclo[6.3.1.1³,⁶.0²,⁷.0⁹,¹¹]tridec-4-ylmethylene-oxypentanetriols,
the 10-oxapentacyclo[6.3.1.1³,⁶.0²,⁷.0⁹,¹¹]tridec-4-ylmethylene-oxyhexanetriols,
the 10-oxapentacyclo[6.3.1.1³,⁶.0²,⁷.0⁹,¹¹]tridec-4-ylmethylene-oxyoctanetriols,
the 10-oxapentacyclo[6.3.1.1³,⁶.0²,⁷.0⁹,¹¹]tridec-4-ylmethylene-oxynonanetriols, and the like;
the 10-oxapentacyclo[6.3.1.1³,⁶.0²,⁷.0⁹,¹¹]tridec-4-ylmethylene-oxyalkanetetrols, e.g.,
the 10-oxapentacyclo[6.3.1.1³,⁶.0²,⁷.0⁹,¹¹]tridec-4-ylmethylene-oxyhexanetetrols, and the like;
the 10-oxapentacyclo[6.3.1.1³,⁶.0²,⁷.0⁹,¹¹]tridec-4-ylmethylene-oxyalkanepentols; and the like.

The 10 - oxapentacyclo[6.3.1.1³,⁶.0²,⁷.0⁹,¹¹]tridec - 4, 5-ylene-dialkanols are exemplified, preferably, by such compounds as 10 - oxapentacyclo[6.3.1.1³,⁶.0²,⁷.0⁹,¹¹]tridec-4,5-ylene-dimethanol, 10-oxapentacyclo

[6.3.1.1³,⁶.0²,⁷.0⁹,¹¹]

tridec-4,5-ylene-diethanol, and the like.

The second component employed in the preparation of the novel copolymers of this invention is a vicinal monoepoxide free from hydroxyl groups and composed solely of carbon, hydrogen and oxygen, and in some instances halogen or cyano-nitrogen. These compositions can be represented by the formula:

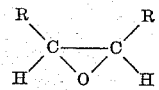

wherein R represents a member selected from the group consisting of hydrogen, alkyl, haloalkyl, aryl, and wherein both R's taken together can form a cycloaliphatic group. The cycloaliphatic groups can be unsubstituted or can contain substituents such as nitrile, ester groups, and the like. Preferred compositions are those wherein the sum of the carbon atoms in both R groups is no greater than 12, and preferably no greater than 6. Illustrative R radicals include, among others, methyl, ethyl, propyl, butyl, isobutyl, hexyl, isohexyl, 3-propylheptyl, dodecyl, octadecyl, phenyl, benzyl, tolyl, ethylphenyl, butylphenyl, phenylethyl, phenylpropyl, cyclopentyl, cyclohexyl, 2-methylcyclohexyl, cycloheptyl, and the like. It is to be understood, also, that the term "lower 1,2-alkylene oxides" designates that each R variable of the above-depicted structural formula can be satisfied by hydrogen or lower alkyl, e.g., methyl, ethyl, propyl, isobutyl and the like.

Representative vicinal monoepoxide monomers which can be employed include, for example, ethylene oxide, propylene oxide, 1,2-butylene oxide, 2,3-butylene oxide, the epoxypentanes, the epoxyhexanes, 2,3-epoxyheptane, 5-butyl-3,4-epoxyoctane, styrene oxide, ortho-, meta-, and para-ethylstyrene oxide, didecyl 4,5-epoxycyclohexane-1, 2-dicarboxylate, 3,4-epoxycyclohexanecarbonitrile, 3,4-dichloro-1,2-epoxybutane, epichlorohydrin, and the like.

The particularly preferred epoxide comonomers which can be polymerized with the aforementioned monoepoxy alcohols include the lower 1,2-alkylene oxides, e.g., ethylene oxide, propylene oxide, 1,2-butylene oxide and 2,3-butylene oxide, and styrene oxide.

By the term "copolymer" as employed throughout the specification and appended claims is meant a composition, containing in polymerized form, two or more epoxides, at least one of which is the monoepoxy alcohol and at least one other of which is the epoxide comonomer hereinbefore discussed. Hence the term includes copolymers, terpolymers, and the like.

In practice, the novel copolymers of this invention are prepared by polymerizing the monoepoxy alcohol and the vicinal monoepoxide monomer in the presence of a catalyst as hereinafter indicated.

Among the catalysts contemplated include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like. In addition, the tetraalkyl titanates, e.g., tetraethyl titanate, tetraisopropyl titanate, tetrabutyl titanate, and the like, also are contemplated. Basic catalysts, though not as preferred as the above exemplified acidic catalysts, also can be employed. Illustrative basic catalysts include, for instance, the alkali metal hydroxides, e.g., sodium hydroxide, potassium hydroxide, and the like; the amines, e.g., alphamethylbenzyldimethylamine, dimethylethylamine, triethylamine, tripropylamine, trimethylammonium hydroxide, and the like.

The concentration of the polymerization catalyst can range from about 0.01, and lower, to about 10.0, and higher, weight percent, based on the combined weight of monoepoxy alcohol and vicinal monoepoxide. The polymerization reaction can be effected over a wide temperature range, e.g., from about 0° C. to about 225° C., and higher. A temperature in the range of from above about 25° C. to about 150° C. is preferred. The optimum temperature will depend, in the main, on various factors such as the particular monoepoxy alcohol component(s) employed, the monoepoxide comonomers, the particular catalyst employed, the concentration of the catalyst, the use of an inert normally liquid organic vehicle, and other considerations. The polymerization reaction time can vary from several minutes to several days, e.g., from 10 minutes to 24 hours, and longer, depending upon the correlation of such factors as illustrated above.

The polymerization reaction can be carried out via the bulk, suspension, or solution polymerization routes. The suspension and solution techniques involve the use of an inert normally-liquid organic medium such as, for instance, the aromatic hydrocarbons, e.g., benzene, toluene, xylene, ethylbenzene, and the like; various oxygenated organic compounds such as anisole, dioxane, tetrahydrofuran, butyl acetate, amyl acetate, cyclohexanone, the dimethyl and diethyl ethers of ethylene glycol, of propylene glycol, of diethylene glycol, and the like; the normally-liquid saturated hydrocarbons including the open chain, cyclic, and alkyl-substituted cyclic saturated hydrocarbons such as, the hexanes, the heptanes, the octanes, 2-ethylhexane, cyclopentane, cyclohexane, cycloheptane, the lower alkyl substituted-cyclopentanes, the lower alkyl substituted-cyclohexanes, the lower alkyl substituted-cycloheptanes, various normally-liquid petroleum hydrocarbon fractions, decahydronaphthalene, and the like.

The resulting polyhydric copolymeric product can be recovered from the inert normally liquid organic vehicle (if one is employed) by various well known expediencies. For example, if the organic vehicle is a suspending medium, i.e., a vehicle in which the copolymeric product is essentially insoluble, then filtration, decantation, and the like, are typical means for recovering the suspended copolymer. The recovered copolymer then can be dried by heating under reduced pressure, if desired. If the resulting polyhydric copolymeric product is soluble in the organic vehicle which is employed in the polymerization reaction, then the copolymeric product can be recovered from the solution via the technique of precipitation. This can be accomplished by adding to the solution an inert liquid which is miscible with said organic vehicle but which is a non-solvent for the copolymer product. Of course, the copolymeric product, also can be recovered from solution by heating said solution to thus drive off the organic vehicle. If desired, the resulting solution or suspension which contains the copolymeric product can be employed in the esterification reaction without removing the organic vehicle therefrom. In addition, the resulting polyhydric copolymeric product can be subjected to a wash treatment such as with water, an aqueous caustic solution, lower aliphatic alcohols, etc., to thus remove impurities, e.g., catalytic ash, therefrom.

The polymerization of the monoepoxy alcohol compound and the monoepoxide comonomer involves the reaction of the hydroxy group of the monoepoxy alcohol with a vicinal epoxy group,

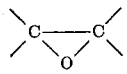

of either the monoepoxide comonomer or another molecule of the monoepoxy alcohol. Hence the copolymeric product obtained will be a random polymer. In some instances, it might be expected that the same type of polymer structure could be obtained by the homopolymerization of the proper epoxy alcohol rather than the copolymerization of the epoxy alcohol and the monoepoxide comonomer. For example, the homopolymerization of 4-oxatetracyclo[6.2.1.0$^{2,7}$.0$^{3,5}$]undec-9-oxyethanol or the copolymerization of ethylene oxide with 4-oxatetracyclo[6.2.1.0$^{2,7}$.0$^{3,5}$]undecan-9-ol give polymeric products according to the following equations:

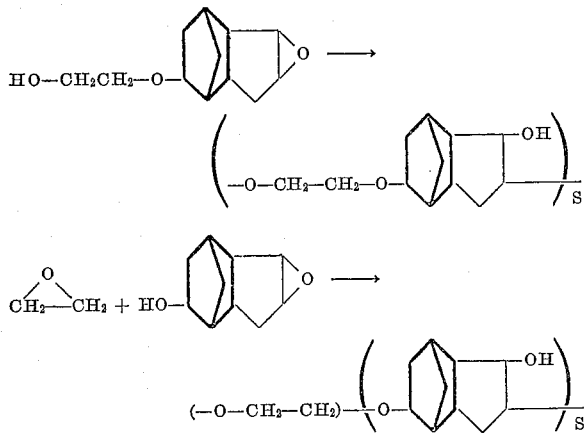

wherein $p$ and $s$ have a value of 1 and greater. However, the copolymer would tend to be a random polymer while the homopolymer would be more regular. This randomness is responsible for the difference in physical properties between the homopolymer and the copolymer.

Thus by way of illustration, if one structurally designates the monoepoxy alcohol compound as follows:

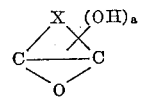

wherein $a$ is an integer which has a value, preferably, of from 1 to 6 inclusive, and wherein X represents the remainder of the monoepoxy alcohol molecule excluding the vicinal epoxy group, i.e.,

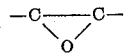

and the alcoholic hydroxy group(s), i.e., —OH; then the resulting copolymer is characterized by the recurring unit:

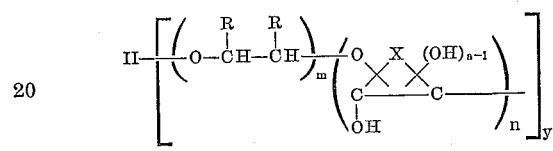

wherein R, X, and $a$ have the same value as previously defined; $m$ has a value of from 1 to 4, $n$ has a value of from 1 to 10, with the proviso that $n$ and $m$ respectively do not have one particular value for all the recurring units of the polymer, and $y$ represents a number which has a value greater than 2 and up to 1000, and higher. For use as an essential component in the preparation of drying oils, it is preferred that $y$ has a value of greater than 2 and up to about 100.

A distinguishing feature of the novel copolymers of this invention is that the amount of vicinal epoxy comonomer chemically combined therein can vary over a wide range imparting unique, and surprising properties to the composition. For example, it has been found that the incorporation of from 15–20 weight percent of an epoxy monomer, such as butylene oxide or propylene oxide, into the copolymer, lowers the melting point from about 230–235° C. for the homopolymer to about 140–150° C. for the copolymer. At higher concentrations of the comonomer, for instance 75 weight percent in copolymerized form, the copolymers are liquid and useful for example a polyol for polymethane foams. Hence, a wide variety of properties can be imparted to varnish or coating compositions depending upon the particular copolymer employed.

Preferably the copolymer can contain from about 2, and lower, to about 98 and higher, of either the monoepoxy alcohol or vicinal epoxy monomer therein, based on the total weight of said alcohol and monomer. The preferred copolymers contain a major proportion by weight of the monoepoxy alcohol and a minor proportion by weight of the vicinal epoxy monomer, based on the total weight of reactants. Those copolymers which contain up to 50 weight percent of 1,2-alkylene oxides, e.g., ethylene oxide, propylene oxide, the epoxybutanes, and the like, based on the weight of said copolymer, are highly preferred.

Extremely useful and valuable varnishes or coating compositions can be prepared by the esterification reaction of the above described polyhydric copolymers with an aliphatic monocarboxylic acid. Among the aliphatic monocarobxylic acids contemplated include the saturated and ethylenically unsaturated acids. The ethylenically unsaturated aliphatic monocarboxylic acids are preferred. Illustrative acids include, for instance, butanoic acid, hexanoic acid, caprylic acid, lauric acid, capric acid, myristic acid, oleic acid, linoleic acid, stearic acid, licanic acid, ricinoleic acid, hexenoic acid, hexadienoic acid, octenoic acid. Acids derived from natural sources such as, for example, castor oil, dehydrated castor oil, coconut oil, cottonseed oil, oiticaca oil, perilla oil, olive oil, safflower oil, sardine oil, soyabean oil, tall oil, linseed oil, sunflower seed oil, walnut oil, menhaden oil, poppy-seed oil, tung oil, and mixtures thereof, are advantageous both from an economy standpoint and since highly useful varnishes result from the esterification reaction. If desired, the reaction can be effected in the presence of from about 0.01, and lower to 10.0 weight percent, and higher, based on the total weight of the reactants, of a catalyst such as those described previously, and also, the reaction can be conducted in the presence of an inert normally-liquid organic medium. Suitable media include, for instance, the aromatic hydrocarbons, e.g., benzene, toluene, xylene, ethylbenzene, and the like; the saturated aliphatic and cycloaliphatic hydrocarbons, e.g., hexane, heptane, cyclopentane, cyclohexane, lower alkyl substituted-cyclohexane, and the like; the oxygenated organic compounds, e.g., acetone, methyl ethyl ketone, methyl isobutyl ketone, cyclohexanone, tetrahydrofuran, dioxane, diisopropyl ether, diethyl ether, and the like. The aromatic hydrocarbons are preferred.

The above-described esterification reaction can be conducted at a temperature in the range of from about 100° C., and lower, to about 300° C. and higher, and preferably, from about 150° C. to about 250° C. The reaction period can vary from several minutes to several days depending, of course, on factors such as the reaction temperature, the concentrations and reactivities of the reactants, the presence or absence of a catalyst, and the like. In general, a reaction period of from about 0.5 to about 24 hours is suitable. Water resulting from the esterification reaction can be removed by methods well known to the art.

The proportions of the polyhydric copolymer and aliphatic monocarboxylic acid which are employed in the esterification reaction most conveniently are expressed in terms of hydroxy (—OH) groups and carboxy (—COOH) groups. Highly useful varnish or coating compositions are obtained by employing from about 0.1 to 1.0 carboxy group of the aliphatic monocarboxylic acid per hydroxy group of the polyhydric copolymer, and preferably, from about 0.2 to 0.9 carboxy group per hydroxy group.

The esterification products of the polyhydric copolymer and aliphatic monocarboxylic acid generally are obtained as solid or solid-like products. These products can be classified as drying compositions or non-drying compositions. The former are those which contain ethylenic unsaturation whereas the latter are saturated compositions. Both the drying and non-drying compositions are useful as modifiers for coating resins such as phenolformaldehyde resins, melamine-formaldehyde resins, alkyd resins, and the like. These compositions are outstanding as modifiers because they have a wide range of compatibility, they impart improved caustic, water, and chemical resistance to the resin coatings they are modifying, and they impart improved flexibility and toughness. The drying compositions are capable of "drying" or curing to excellent protective coatings with or without the application of heat. It is generally desirable to employ various metallic salts of organic compounds known to the art as "driers," to accelerate the drying process. The drying can be accomplished at temperatures in the range of from about 10° to about 250° C. for a period of time sufficient to produce the desired property in the resin. The concentration of the drier compound can range from about 0.001 to about 5.0 weight percent, and higher, based on the weight of the drying compound (copolymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

The monoepoxy alcohols employed in the preparation of the novel copolymers of this invention can be conveniently prepared from readily available materials.

For example, the preparation of 4-oxatetracyclo[6.2.1.0$^{2,7}$.0$^{3,5}$]undecan-9-ol is effected by the reaction of dicyclopentadiene with an aqueous solution of an inorganic acidic catalyst, e.g., an aqueous solution of 25 weight percent sulfuric acid, at an elevated temperature, e.g., from about 75° C. and lower, to about 125° C., and higher, and for a period of time sufficient to produce tricyclo[5.2.1.0$^{2,6}$]dec-3-en-8-ol as the product. Epoxidation of the resulting olefinically unsaturated alcohol product results in 4-oxatetracyclo[6.2.1.0$^{2,7}$.0$^{3,5}$]undecan-9-ol. It is pointed out at this time that the epoxidation reaction of the olefinically unsaturated alcohol precursors which result in the monoepoxy alcohol compounds that are employed as a component(s) in the the novel curable systems of the invention will be described in detail at a later section of the specification.

The preparation of 4-oxatetracyclo[6.2.1.0$^{2,7}$.0$^{3,5}$]undec-9-oxyalkanol, 4-oxatetracyclo[6.2.1.0$^{2,7}$.0$^{3,5}$]undec-9-oxyalkane-poly-ol, 10-oxapentacyclo[6.3.1.1$^{3,6}$.0$^{2,6}$.0$^{9,11}$]tridec-4-oxyalkanol, or 10-oxapentacyclo[6.3.1.1$^{3,6}$.0$^{2,7}$.0$^{9,11}$]tridec-4-oxyalkane-poly-ol is accomplished, for example, by reacting a molar excess of a polyhydric alcohol, e.g., ethylene glycol, glycerol, 1,2,6-hexanetriol, erythritol, pentaerythritol, and the like, with dicyclopentadiene or tetracyclo[6.2.1.1$^{3,6}$.0$^{2,7}$]dodeca-4,9-diene, in the presence of boron trifluoride catalyst, at an elevated temperature, e.g., from about 50° C., and lower, to about 125° C., and higher, and for a period of time to produce tricyclo[5.2.1.0$^{2,6}$]dec-3-en-8-oxylakanol, tricyclo[5.2.1.0$^{2,6}$]dec-3-en-8-oxyalkane-poly-ol, tetracyclo[6.2.1.1$^{3,6}$.0$^{2,7}$]dodec-9-en-4-oxyalkanol, or tetracyclo[6.2.1.1$^{3,6}$.0$^{2,7}$]dodec-9-en-4-oxyalkane-poly-ol as the product. Epoxidation of the resulting product gives the monoepoxy alcohol compound under consideration.

The preparation of 4-oxatetracyclo[6.2.1.0$^{2,7}$.0$^{3,5}$]undecane-9,10-diol or 10-oxapentacyclo[6.3.1.1$^{3,6}$.0$^{2,7}$.0$^{9,11}$]tridecane-4,5-diol is effected, for example, by reacting dicyclopentadiene or tetracyclo[6.2.1.1$^{3,6}$.0$^{2,7}$]dodeca-4,9-diene with aqueous hydrogen peroxide (equimolar concentration), in the presence of osmium tetroxide catalyst, at an elevated temperature, and for a period of time sufficient to produce tricyclo[5,2.1.0$^{2,6}$]dec-3-ene-8,9-diol or tetracyclo[6.2.1.1$^{3,6}$.0$^{2,7}$]dodec-9-ene-4,5-diol as the product. Epoxidation of the resulting product produces the monoepoxy alcohol compound.

Monomeric 4-oxatetracyclo[6.2.1.0$^{2,7}$.0$^{3,5}$]undecane-10,11-diol can be prepared by the reaction of dicyclopentadiene and lead tetraacetate, under the influence of heat, to yield tricyclo[5.2.1.0$^{2,6}$]dec-3-ene-9,10-diol, followed by epoxidizing said diol to obtain the monoepoxy alcohol compound in question.

The preparation of 10-oxapentacyclo[6.3.1.1$^{3,6}$.0$^{2,7}$.0$^{9,11}$]tridecan-4-ol is as follows. The Diels-Adler reaction of equimolar quantities of cyclopentadiene and vinyl acetate results in 5-acetoxy-bicyclo[2.2.1]hept-2-ene. Subsequent reaction of the bicyclo product with cyclopentadiene yields 4-acetoxy-tetracyclo[6.2.1.1$^{3,6}$.0$^{3,6}$.0$^{2,7}$]dodec-9-ene. The reaction of the tetracyclo product with potassium hydroxide yields tetracyclo[6.2.1.1$^{3,6}$.0$^{2,7}$]dodec-9-en-4-ol which can be epoxidized to give the monoepoxy alcohol compound under discussion.

The preparation of 10-oxapentacyclo[6.3.1.1$^{3,6}$.0$^{2,7}$.0$^{9,11}$]tridec-4-ylmethyleneoxyalkanol, 10-oxapentacyclo[6.3.1.1$^{3,6}$.0$^{2,7}$.0$^{9,11}$]tridec-4-ylmethyleneoxyalkane-poly-ol, 10-oxapentacyclo[6.3.1.1$^{3,6}$.0$^{2,7}$.0$^{9,11}$]tridec-4-ylalkanol or 10-oxapentacyclo[6.3.1.1$^{3,6}$.0$^{2,7}$.0$^{9,11}$]tridec-4,5-ylenedialkanol, also, can be prepared via the Diels-Alder synthesis route, followed by epoxidizing the Diels-Alder product. For instance, the reaction of at least two mols of cyclopentadiene with one mol of alkenol, allyl hydroxyalkyl ether, allyl polyhydroxyalkyl ether, or alkenediol will yield tetracyclo[6.2.1.1$^{3,6}$.0$^{2,7}$]dodec-9-en-4-ylalkanol, tetracyclo[6.2.1.1$^{3,6}$.0$^{2,7}$]dodec-9-en-4-ylmethyleneoxyalkanol, tetracyclo[6.2.1.1$^{3,6}$.0$^{2,7}$]dodec-9-en-4-ylmethyleneoxyalkane-poly-ol, or tetracyclo[6.2.1.1$^{3,6}$.0$^{2,7}$]dodec- 9-en-4,5-ylene-dialkanol, respectively. Epoxidation of these olefinically unsaturated alcohol precursors will produce the monoepoxy alcohol compounds under consideration.

The 4-oxatetracyclo[6.2.1.0$^{2,7}$.0$^{3,5}$]undec-9-oxy(mono- and polyalkyleneoxy)alkanols can be prepared by reacting one mol of tricyclo[5.2.1.0$^{2,6}$]dec-3-en-8-ol with at least two mols and upwards to 100 mols, or more, of a saturated aliphatic mono-vicinal-epoxyhydrocarbon (hereinafter termed "olefin oxide"), e.g., ethylene oxide, 1,2-epoxypropane, 1,2-epoxybutane, 2,3-epoxybutane, styrene oxide, 1,2-epoxyoctane, 1,2-epoxydodecane, 1,2-epoxyoctadecane, 1-phenyl-2,3-epoxybutane, 1-cyclohexyl-2,3-epoxypentane, and the like; in the presence of an alkali metal hydroxide catalyst, e.g., about 0.1 weight percent potassium hydroxide, based on the total weight of the reactants; under essentially anhydrous conditions; and at an elevated temperature, e.g., from about 90° C., and lower, to about 140° C., and higher. If desired, the reaction product mixture can be purified by washing with water or an aqueous acetic acid solution to remove or neutralize the residual catalyst. The resulting product, i.e., tricyclo[5.2.1.0$^{2,6}$]dec-3-en-8-oxy(mono- or polyalkyleneoxy)-alkanol, then can be reacted with an epoxidizing agent to yield the monoepoxy alcohol compound. The following structural formula characterizes the 4-oxatetracyclo[6.2.1.0$^{2,7}$.0$^{3,5}$]undec-9-oxy(mono- and polyalkyleneoxy)alkanols:

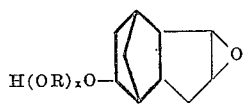

wherein $x$ is a number having an average value of at least 2 (and upwards to 100, and greater), and wherein R is a divalent saturated aliphatic hydrocarbon radical. It is to be noted that $x$ has an average value since the epoxy alcohol product which results from the reaction is not composed of discrete, identical molecules, but rather, the product is composed of molecules in which the value for $x$ can vary over a broad range.

The 4-oxatetracyclo[6.2.1.0$^{2,7}$.0$^{3,5}$]undec-9,10-ylene-di[oxy(mono- and polyalkyleneoxy)alkanols] can be prepared by reacting one mol of tricyclo[5.2.1.0$^{2,6}$]dec-3-ene-8,9-diol with at least 4 mols of an olefin oxide, followed by epoxidation, in the manner explained supra. These monoepoxy alcohols can be characterized as follows:

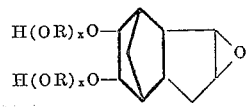

wherein each $x$, individually, is a number having an average value of at least 2 (and upwards to 100 and greater), and wherein R is a divalent saturated aliphatic hydrocarbon radical.

The 4-oxatetracyclo[6.2.1.0$^{2,7}$.0$^{3,5}$]undec-10,11-ylene-di[oxy(mono- and polyalkyleneoxy)alkanols] can be prepared by the reaction of one mol of tricyclo[5.2.1.0$^{2,6}$]dec-3-ene-9,10-diol with at least 4 moles of an olefin oxide, followed by epoxidation, in the manner explained supra. These monoepoxy alcohols have the following structural formula:

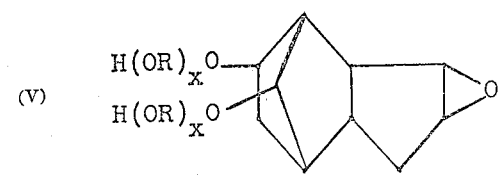

wherein $x$ and R have the values set forth in Formula IV supra.

The 10-oxapentacyclo[6.3.1.1$^{3,6}$.0$^{2,7}$.0$^{9,11}$]tridec-4-oxy (mono- and polyalkyleneoxy)alkanols are prepared by reacting one mol of tetracyclo[6.2.1.1$^{3,6}$.0$^{2,7}$]dodec-9-en-4-ol with at least 2 mols of an olefin oxide, followed by epoxidation, in the manner explained supra. These monoepoxy alcohols are characterized by the following structural formula:

(VI) 

wherein $x$ and R have the values set forth in Formula IV supra.

The 10-oxapentacyclo[6.3.1.1$^{3,6}$.0$^{2,7}$.0$^{9,11}$]tridec-4,5-ylene-di[oxy(mono- and polyalkyleneoxy)alkanols] are prepared by the reaction of at least 4 mols of an olefin oxide per mol of tetracyclo[6.2.1.1$^{3,6}$.0$^{2,7}$]dodec-9-ene-4,5-diol, followed by epoxidation, in the manner explained supra. The resulting monoepoxy alcohols are thusly characterized:

(VII) 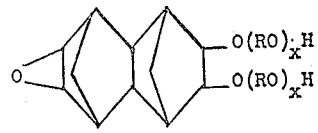

wherein $x$ and R have the values set forth in Formula IV supra.

The 10-oxapentacyclo[6.3.1.1$^{3,6}$.0$^{2,7}$.0$^{9,11}$]tridec-4-ylalkyleneoxyalkanols can be prepared by the reaction of equimolar quantities of tetracyclo[6.2.1.1$^{3,6}$.0$^{2,7}$]dodec-9-en-4-ylalkanol and an olefin oxide, followed by epoxidation, in the manner explained supra. These monoepoxy alcohols have the following formula:

VIII 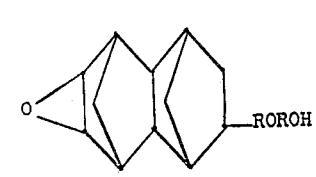

wherein each R can be the same or different divalent saturated aliphatic hydrocarbon radicals.

The 10-oxapentacyclo[6.3.1.1$^{3,6}$.0$^{2,7}$.0$^{9,11}$]tridec-4-ylalkyleneoxy(mono- and polyalkyleneoxy)alkanols can be prepared by the reaction of at least 2 mols of an olefin oxide per mol of tetracyclo[6.2.1.1$^{3,6}$.0$^{2,7}$]dodec-9-en-4-ylalkanol, then expoxidizing, in the manner explained supra. The following structural formula illustrates these monoepoxy alcohol compounds:

IX 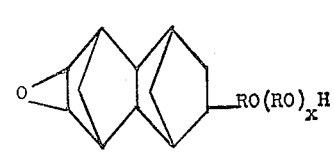

wherein each R, individually, is a divalent saturated aliphatic hydrocarbon radical, and wherein $x$ is a number having an average value of at least 2.

The 10-oxapentacyclo[6.3.1.1$^{3,6}$.0$^{2,7}$.0$^{9,11}$]tridec-4-5-ylene-di(alkyleneoxyalkanols) are obtained by reacting two mols of an olefin oxide per mol of tetracyclo[6.2.1.1$^{3,6}$.0$^{2,7}$]dodec-9-en-4-5-ylene-dialkanol, followed by epoxidation, in the manner explained supra. The following formula characterizes the monoepoxy alcohols under consideration:

X 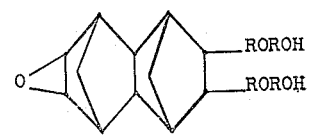

wherein each R can be ahe same or different divalent saturated aliphatic hydrocarbon radicals.

The 10 - oxapentacyclo[6.3.1.1$^{3,6}$.0$^{2,7}$.0$^{9,11}$]tridec - 4 - 5-ylene - di[alkyleneoxy(mono- and polyalkyleneoxy)alkanols] are prepared by the reaction of at least 4 mols of an olefin oxide per mol of tetracyclo[6.2.1.1$^{3,6}$.0$^{2,7}$]dodec-9-en-4-5-ylene-dialkanol, followed by epoxidation, in the manner explained supra. The following structural formula illustrates the monoepoxy alcohols under discussion:

XI

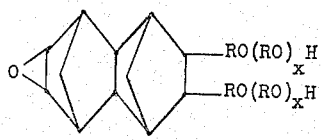

wherein each R, individually, is a divalent saturated aliphatic hydrocarbon radical, and wherein $x$ is a number having an average value of at least 2.

It is to be understood that the oxymethyleneoxy radical, i.e., —OCH$_2$O—, is not encompassed within the scope of the monoepoxy alcohol compounds which are employed in the preparation of the novel polyhydric polymers.

The monoepoxy alcohol compounds can be prepared by the reaction of the corresponding olefinically unsaturated alcohol precursor with an epoxidizing agent. Among the epoxidizing agents contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, peroctanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of peracid is preferred. The epoxidation reaction can be conducted at a temperature in the range of from about 0° C., and lower, to about 100° C., and higher, and preferably, from about 20° to about 80° C. Theoretically, to effect complete epoxidation of the olefinically unsaturated alcohol precursor, equimolar quantities of peracid and precursor should be employed. However, since some degradation of the peracid occurs during the epoxidation reaction, it is desirable to employ a quantity of peracid in excess of that theoretically required to effect essentially complete epoxidation of said precursor, e.g., from about 1.1 to about 10, and higher, mols of peracid per mol of precursor. The epoxidation reaction is conducted for a period of time sufficient to introduce oxirane oxygen at the site of the carbon to carbon double bond present in the precursor, eg., from several minutes to several hours. Periodic analysis of samples of the reaction mixture to determine the quantity of peracid consumed during the epoxidation reaction can be readily performed by the operator by well established techniques and procedures. At the termination of the epoxidation reaction, any unreacted olefinic precursor, acid by-product, inert vehicle, if employed, and the like, can be recovered from the reaction product mixture, for example, by distillation under reduced pressure. Further well known purification techniques can be employed, as desired.

In various embodiments, the polyhydric copolymeric products which are contemplated as an ingredient in the preparation of the novel drying and non-drying coating compositions include not only the novel copolymers of the monoepoxy alcohol compounds and monoepoxides which are enumerated hereinbefore as (a) through (v), but also the polyhydric copolymers of the monoepoxy alcohol, the vicinal monoepoxide, and other epoxy alcohols, such as the mono vicinal-epoxycyclopentanols, e.g., 2,3-epoxycyclopentanol, 3,4-epoxycyclopentanol, lower alkyl substituted-2,3-epoxycyclopentanol, 4-methyl-2,3-epoxycyclopentanol, and the like; the polyhydric copolymers of the mono vicinal-epoxycyclopentylalkanols, e.g., 2,3-epoxycyclopentylmethanol, 3,4-epoxycyclopentylmethanol, 3,4-epoxycyclopentylpropanol, lower alkyl substituted-2,3-epoxycyclopentylmethanol, and the like; the mono vicinal-epoxybicycloalkanols, e.g., 3-oxatricyclo[3.2.1.0$^{2,4}$]octan-6-ol, 3-oxatricyclo[3.2.1.0$^{2,4}$]octane-6,7-diol, lower alkyl substituted-3-oxatricyclo[3.2.1.0$^{2,4}$]octan-6-ol, lower alkyl substituted - 3 - oxatricyclo[3.2.1.0$^{2,4}$]octane-6,7-diol, and the like.

Various modifications and embodiments of the invention(s) also are contemplated. For instance, the monoepoxy alcohol compound can be reacted with a polyepoxide, e.g., dicyclopentadiene dioxide, 4 - vinylcyclohexene dioxide, bis(2,3 - epoxycyclopentyl)ether, 6-methyl - 3,4 - epoxycyclohexylmethyl 6 - methyl - 3,4-epoxycyclohexanecarboxylate, and the like, under the operative conditions noted previously, to produce relatively high molecular weight and/or cross-linked polymeric products. The degree or extent of cross-linking and ultimate molecular weight of these polymeric products would depend, to a considerable degree, on the quantity of polyepoxide employed and the curing conditions. The amount of polyepoxide employed can range from 1.0 to 99 weight percent, based on the total charge.

The novel polyhydric polymeric products described in this specification also can be reacted with polyepoxides such as those illustrated above, to produce hard, solid, infusible, resinous products which have utility in the coating, laminating, molding, and/or encapsulating arts.

Fillers and pigments can be added to the novel esterification products (varnishes) to produce special effects such as coloration, inhibition of corrosion, semigloss, gloss, decoration, increased hardness, and the like. The technology of fillers and pigment and their effects are well known in the art. Examples of pigments are chrome green, chrome yellow, iron oxides, silica, talc, titanium dioxide, zinc oxide, white lead, litharge, and the like.

The following examples are illustrative.

The term "acid number" is defined as the number of milligrams of potassium hydroxide which are required to neutralize the free acid in a gram of substance. In the following experimental examples, the "acid numbers" were determined by dissolving the sample for analysis in a solvent such as xylene and titrating with a standard alcoholic potassium hydroxide solution using phenolphthalein as the indicator. When a solvent was present with the reaction mixture being analyzed, the acid numbers were calculated for the solid, reactive component.

After the polymerizations were completed the viscosities of the products were determined at room temperature using a Brookfield viscometer, Model LVF. Total solids present in the polymer solution were determined by weighing about a one-gram sample of the solution into an aluminum weighing dish measuring about two inches in diameter, heating the open dish in a mechanically convected oven at 160° C. for about 15 minutes, and after cooling to room temperature, the remaining residue was weighed.

The evaluation of the various polymers as baked protective coatings generally involved the following:

(1) The adjustment of the solution viscosity, by the addition of xylene, to allow the preparation of films having a thickness of from 0.7 to 1.8 mils (thousandths of an inch).

(2) Cobalt octoate, 0.01 weight percent as cobalt, was then added to serve as a drier.

(3) Films were applied by dipping Parkerized steel panels with a Fischer-Payne Dip-Coater.

(4) The resulting coated panels were air dried for 15 to 30 minutes and subsequently baked for 30 minutes at 350° F.

(5) A coating was also applied to a glass plate to be used for obtaining Sward hardness values. Baked film thickness range from 0.8 to 2.2 mils.

(6) The resulting coatings were then tested for flexibility with a Parlin-Du Pont Impact Tester, results reported as in. lbs.

(7) Coated panels were tested in boiling water for one hour. The following ratings were used: Excellent—unaffected except for a slight loss of gloss at the air-water interface; good—some softening at the air-water interface; fair—definitely tacky at air-water interface.

(8) Coated panels were tested for caustic resistance by immersion in 20 percent sodium hydroxide for 24 hours at room temperature. The following ratings were used: Excellent—no change; good—very slight softening; fair—in addition to softening, some loss of gloss and adhesion was observed; poor—film was dissolved.

(9) Acid resistance was determined by applying a one weight percent sulfuric acid solution in water to the film used for Sward hardness determination. The test area or spot was covered with a two-inch watch glass filled with the acid solution and allowed to stand for 24 hours.

The following examples are illustrative:

EXAMPLE 1

The compound, tricyclo[5.2.1.0$^{2,6}$]dec-3-en-8-oxy-ethanol, was prepared by the reaction if ethylene glycol with tricyclo[5.2.1.0$^{2,6}$]deca-3,8-diene in the presence of boron trifluoride catalyst. To 833 grams (4.29 mols) of tricyclo-[5.2.1.0$^{2,6}$]dec-3-en-8-oxyethanol maintained at about 40° C., there was added, dropwise, over a period of 3 hours, with stirring, 1,340 grams of a 26.8 weight percent solution of peracetic acid in ethyl acetate. The reaction was exothermic and consequently, the reaction vessel was occasionally cooled with ice. The resulting admixture was maintained at about 40° C. for an additional 3 hours plus standing overnight at room temperature, i.e., about 24° C. for about 15 hours. Analysis of the reaction product mixture indicated that the theoretical amount of peracid had been consumed. Subsequently, the reaction product mixture was diluted with ethylbenzene, and the volatiles, e.g., ethyl acetate, acetic acid by-products, etc., were removed therefrom by distillation under reduced pressure. There was obtained (via fractional distillation) 869 grams of a colorless liquid, i.e., 4-oxatetracyclo[6.2.1.0$^{2,7}$.0$^{3,5}$]undec-9-oxyethanol, which had the following properties: Boiling point, 134°–135° C./0.35 mm. of Hg; $n_D^{30}$, 1.5095.

*Elemental analysis:* Carbon: Found, 68.44%; calculated, 68.54%. Hydrogen: Found, 8.56%; calculated, 8.63%. The yield was 96 percent.

EXAMPLE 2

The compound, tricyclo[5.2.1.0$^{2,6}$]dec-3-en-8-ol, was prepared by the reaction of tricyclo[5.2.1.0$^{2,6}$]deca-3,8-diene in the presence of an aqueous solution of sulfuric acid under the influence of heat. To 150 grams (1 mol) of tricyclo[5.2.1.0$^{2,6}$]dec-3-en-8-ol maintained at about 45°–50° C., there was added, dropwise, over a period of 55 minutes, with stirring, 308 grams of a 27.2 weight percent solution of peracetic acid in ethyl acetate. The resulting admixture then was maintained at about 45°–50° C. for an additional 2.25 hours. Analysis of the reaction product mixture indicated that the theoretical amount of peracid had been consumed. Subsequently, the reaction product mixture was diluted with ethylbenzene, and the volatiles, e.g., ethyl acetate, acetic acid by-product, etc., were removed therefrom by distillation under reduced pressure. There was obtained (via fractional distillation) 164 grams of a colorless liquid, i.e., 4-oxatetracyclo[6.2.1.0$^{2,7}$.0$^{3,5}$]undecan-9-ol which had the following properties: Boiling point, 130°–134° C./2.5 mm. of Hg; $n_D^{30}$, 1.5205. Analysis for epoxide: 96.9 percent.

EXAMPLE 3

The compound, tetracyclo[6.2.1.1$^{3,6}$.0$^{2,7}$]dodec-9-en-4-ol (melting point of 87°–88° C.), is prepared by the saponification of the reaction product obtained by the Diels-Alder synthesis of cyclopentadiene and vinyl acetate. To 176 grams of tetracyclo[6.2.1.1$^{3,6}$.0$^{2,7}$]dodec-9-en-4-ol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec-9-en-4-oxyethanol is dried at an elevated temperature under reduced pressure.

EXAMPLE 4

To a mixture of 200 grams of tetracyclo[6.2.1.1$^{3,6}$.0$^{2,7}$]dodec-9-en-4-oxyethanol and 100 grams of ethyl acetate, there is added under stirring, dropwise, 278 grams of a 27.4 weight percent solution of peracetic acid in ethyl acetate. The reaction is exothermic and consequently, the reaction temperature is controlled at about 45° C. by the rate of addition. After 2.5 hours at this temperature, the reaction is essentially complete. The volatiles, acetic acid by-product, ethyl acetate, etc., are removed by co-distillation with ethylbenzene under reduced pressure. After stripping under high vacuum at about 100° C., there is obtained a yellow, viscous liquid product, i.e., 10-oxapentacyclo[6.3.1.1$^{3,6}$.0$^{2,7}$.0$^{9,11}$]tridec-4-oxyethanol The infrared spectrum discloses the presence of epoxide and hydroxyl groups.

EXAMPLE 5

The compound, tetracyclo[6.2.1.1$^{3,6}$.0$^{2,7}$]dodec-9-en-4-ylmethanol (boiling point of 100° C. at 0.5 mm. of Hg., and $n_D^{30}$ of 1.5362), is prepared via the Diels-Alder synthesis of cyclopentadiene and allyl alcohol. To 190 grams of tetracyclo[6.2.1.1$^{3,6}$.0$^{2,7}$]dodec-9 - en - 4 - ylmethanol, there is added 0.2 gram of potassium hydroxide, followed by heating the resulting admixtures to about 115°–130° C. with stirring. Ethylene oxide is fed into the stirred reaction mixture through a diffuser (below the liquid level) until the weight thereof increases by 43 grams. Then the resulting reaction product mixture is cooled, washed twice with ice water, and dried by heating to about 110° C. under a reduced pressure of 2 mm. of Hg. The resulting product, i.e., tetracyclo[6.2.1.1$^{3,6}$.0$^{2,7}$]dodec-9-en-4-ylmethyleneoxyethanol, is employed in Example 6 to follow.

EXAMPLE 6

To a mixture of 210 grams of tetracyclo[6.2.1.1$^{3,6}$.0$^{2,7}$] dodec-9-en-4-ylmethyleneoxyethanol and 100 grams of ethyl acetate, there is added under stirring, dropwise, 330 grams of a 23 weight percent solution of peracetic acid in ethyl acetate. The reaction is exothermic and consequently, the reaction temperature is controlled to about 40°–50° C. by the rate of addition during the initial stage, and by mild heating in the latter stage. After 3 hours at this temperature, the reaction is essentially complete. The volatiles, acetic acid by-product, ethyl acetate, etc., are removed by co-distillation with ethyl benzene under reduced pressure. After stripping under high vacuum at about 110° C., there is obtained a yellow, viscous liquid product. The product, 10-oxapentacyclo[6.3.1.1$^{3,6}$.0$^{2,7}$.0$^{9,11}$]
    tridec-4-ylmethyleneoxyethanol is identified by its infrared spectrum.

EXAMPLE 7

A mixture of tricyclo[5.2.1.0$^{2,6}$]dec-3-ene-8,9-diol and tricyclo[5.2.1.0$^{2,6}$]dec-4-ene-8,9-diol (melting point of 90° C.) is prepared by the saponification of the reaction product of dicyclopentadiene and lead tetra-acetate. To a reaction vessel which contains 42 grams of the above said diol admixture and 42 grams of ethyl acetate maintained with stirring at about 30° C., there is added, dropwise, over a period of one hour 76 grams of a 26.5 weight percent solution of peracetic acid in ethyl acetate. The resulting solution is maintained at 30° C. for an additional 5 hours. The reaction is essentially complete as indicated by titration for paracetic acid. The volatile materials, i.e., ethyl acetate, acetic acid by-product, etc., are removed by co-distillation with ethylbenzene. The residue product, thus obtained, solidifies on standing and comprises a mixture of 4 - oxatetracyclo[6.2.1.0$^{2,7}$.0$^{3,5}$]undecane - 10,11-diol.

In an analogous manner as above, tricyclo[5.2.1.0$^{2,6}$]undec-3-ene-8,9-diol (which is prepared by the reaction of equimolar quantities of dicyclopentadiene and hydrogen peroxide in the presence of osmium tetroxide) is reacted with a solution of peracetic acid in ethyl acetate, to yield 4-oxatetracyclo[6.2.1.0$^{2,7}$.0$^{3,5}$]undecane-9,10-diol.

EXAMPLE 8

To a reaction vessel which contains 45 grams of ethyl acetate and 44 grams of tetracyclo[6.2.1.1$^{3,6}$.0$^{2,7}$]dodec-9-en-4,5-ylene-dimethanol (a white solid which is isolated from high boiling fractions, i.e., 140°–180° C./0.5 mm. of Hg., resulting from the Diels-Alder synthesis of cyclopentadiene and 2-butene-1,4-diol), maintained at about 30° C. with stirring, there is added, dropwise, over a period of one hour 42 grams of a 26 weight percent solution of peracetic acid in ethyl acetate. The resulting solution is maintained at 30° C. for an additional 5.5 hours to ensure completion of the reaction. The volatile materials, i.e., ethyl acetate, acetic acid by-product, etc., are removed by co-distillation with ethylbenzene. The residue product, thus obtained, solidifies on standing and is identified as 10 - oxapentacyclo[6.3.1.1$^{3,6}$.0$^{2,7}$.0$^{9,11}$]tridec-4,5-ylene - dimethanol by its infrared absorption spectrum.

EXAMPLE 9

To a reaction vessel which contains 40 grams of ethyl acetate and 40 grams of tetracyclo[6.2.1.1$^{3,6}$.0$^{2,7}$]dodec-9-ene-4,5-diol (which is prepared by the reaction of equimolar quantities of tetracyclo[6.2.1.1$^{3,6}$.0$^{2,7}$]dodeca-4,9-diene and hydrogen peroxide in the presence of osmium tetroxide) maintained at about 30° C. with stirring, there is added, dropwise, over a period of 1.5 hours 42 grams of a 26 weight percent solution of peracetic acid in ethyl acetate. The resulting solution is maintained at 30° C. for an additional 6 hours. At the end of this period of time the reaction is essentially complete as indicated by titration for peracetic acid. The volatile materials, i.e., ethyl acetate, acetic acid by-product, etc., are removed by co-distillation with ethylbenzene. The solid residue product, thus obtained, is identified as 10-oxapentacyclo [6.3.1.1$^{3,6}$.0$^{2,7}$.0$^{9,11}$]tridecane-4,5-diol by its infrared adsorption spectrum.

EXAMPLE 10

To 62 grams of tetracyclo[6.2.1.1$^{3,6}$.0$^{2,7}$]dodec-9-en-4-ol (melting point of 87°–88° C.; prepared by the saponification of the reaction product obtained by the Diels-Alder synthesis of cyclopentadiene and vinyl acetate) and 24 grams of ethyl acetate, maintained at about 50°–55° C., there was added to the resulting solution, dropwise, 120 grams of a 28.6 weight percent solution of peracetic acid in ethyl acetate over a period of 35 minutes. After an additional 2 hours at about 50°–55° C., the amount of peracetic acid consumed was 97.7% of the theoretical. The volatiles were removed from the reaction product mixture by co-distillation with ethylbenzene. There was obtained 77 grams of a viscous liquid product identified as 10-oxapentacyclo[6.2.1.1$^{3,6}$.0$^{2,7}$.0$^{9,11}$]tridecan-4-ol.

EXAMPLE 11

To 150 grams of tetracyclo[6.2.1.1$^{3,6}$.0$^{2,7}$]dodec-9-en-4-ylmethanol (boiling point of 100° C./0.5 mm. of Hg and $n_D^{30}$ of 1.5362; prepared by the Diels-Alder synthesis of cyclopentadiene and allyl alcohol) which was maintained with stirring at about 50°–55° C., there was added, dropwise, 232 grams of a 28.6 weight percent solution of peracetic acid in ethyl acetate over a period of 70 minutes. After an adidtional one hour at about 50°–55° C., the amount of peracetic acid consumed was 98.5 percent of the theoretical. The volatiles were removed from the reaction product mixture by co-distillation with ethylbenzene. There was obtained 177 grams of a viscous product containing 10-oxapentacyclo[6.6.3.1.1$^{3,6}$.0$^{2,7}$.0$^{9,11}$]
    tridec-4-ylmethanol

EXAMPLE 12

To a reaction vessel which contains 112 grams of tricyclo[5.2.1.0$^{2,6}$]dec-3-en-8-oxypropanediol (boiling point of 175°–180° C. and $n_D^{25}$ of 1.5186; prepared by the boron trifluoride-catalyzed addition of glycerol to dicylopentadiene under the influence of heat), maintained at about 30° C. with stirring, there is added, dropwise, 168 grams of a 25 weight percent solution of peracetic acid in ethyl acetate over a period of about 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethyl-benzene. The viscous liquid product, thus obtained, is identified as 4-oxatetracyclo[6.2.1.0$^{2,7}$.0$^{3,5}$]undec - 9-oxypropanediol (or glycerol mono - 4 - oxatetracyclo[6.2.1.0$^{2,7}$.0$^{3,5}$]undec-9-enyl ether) by inspection of its infrared absorption spectrum.

EXAMPLE 13

To a reaction vessel which contains 800 grams of tricyclo[5.2.1.0$^{2,6}$]dec-3-en-8-oxy-n-butanol (which results from the boron trifluoride catalyzed addition of 1,4-butanediol to tricyclo[5.2.1.0$^{2,6}$]deca-3,8-diene under the influence of heat), maintained at about 30° C. with stirring, there is added, dropwise, 1550 grams of a 26.2 weight percent solution of peracetic acid in ethyl acetate over a period of 4 hours. After an additional 6 hours at about 45° C., the reaction is essentially complete as indicated by a titration for paracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo[6.2.1.0$^{2,6}$.0$^{3,5}$]undec-9-oxy-n-butanol by inspection of its infrared absorption spectrum.

EXAMPLE 14

To a reaction vessel which contains 100 grams of ethyl acetate and 125 grams pentaerythritol mono-tricyclo-[5.2.1.0$^{2,6}$]dec-3-en-8-yl ether (which results from the boron trifluoride-catalyzed addition of pentaerythritol to tricyclo[5.2.1.0$^{2,6}$]deca-3,8-diene under the influence of heat), maintained at about 30° C. with stirring, there is added, dropwise, 168 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as pentaerythritol mono-4-oxatetracyclo-[6.2.1.0$^{2,7}$.0$^{3,5}$]undec-9-yl ether by inspection of its infrared absorption spectrum and analysis for the epoxide group.

EXAMPLE 15

To a reaction vessel which contains 76 grams of hexanetriol mono - tetracyclo[6.2.1.1$^{3,6}$.0$^{2,7}$]dodec-9-en-4-yl ether (which results from the boron trifluoride catalyzed addition of 1,2,6-hexanetriol to tetra[6.2.1.1$^{3,6}$.0$^{2,7}$]dodeca-4,9-diene under the influence of heat), maintained at about 30° C. with stirring, there is added, dropwise, 84 grams of a 25 weight percent solution of peracetic acid in ethyl acetate over a period of 1.5 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as hexanetriol.

mono-10-oxapentacyclo[6.3.1.1$^{3,6}$.0$^{2,7}$.0$^{9,11}$]tridec-4-yl ether by inspection of its infrared absorption spectrum.

EXAMPLE 16

To a reaction vessel which contains 120 grams of glycerol mono - tetracyclo[6.2.1.1$^{3,6}$.0$^{2,7}$]dodec-9-en-4-yl ether (which results from the boron trifluoride catalyzed addition of glycerol to tetracyclo[6.2.1.1$^{3,6}$.0$^{2,7}$]dodeca-4,9-diene under the influence of heat), maintained at about 30° C. with stirring, there is added, dropwise, 165 grams of a 25.5 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as glycerol mono - 10-oxapentacyclo[6.3.1.1$^{3,6}$.0$^{2,7}$.0$^{9,11}$]tridec-4-yl ether by inspection of its infrared absorption spectrum.

EXAMPLE 17

A. To a reaction vessel which contains 66 grams of glycerol mono - tetracyclo[6.2.1.1$^{3,6}$.0$^{2,7}$]dodec-9-en-4-ylmethyl ether (which results from the Diels-Adler synthesis of 2 mols of cyclopentadiene with one mol of glycerol monoallyl ether), maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as glycerol mono-10-oxapentacyclo[6.3.1.1$^{3,6}$.0$^{2,7}$.0$^{9,11}$]tridec-4-ylmethyl ether by inspection of its infrared absorption spectrum.

B. In an analogous manner as above, pentaerythritol mono - tetracyclo[6.2.1.1$^{3,6}$.0$^{2,7}$]dodec - 9-en-4-ylmethyl ether (prepared from the Diels-Adler synthesis of 2 mols of cyclopentadiene with one mol of pentaerythritol monoallyl ether) is reacted with a solution of peracetic acid in ethyl acetate to give a viscous liquid product which is identified as pentaerythritol mono-10-oxapentacyclo-[6.3.1.1$^{3,6}$.0$^{2,7}$.0$^{9,11}$]tridec-4-ylmethyl ether by its infrared absorption spectrum.

EXAMPLE 18

To a reaction vessel which contains 140 grams of tetracyclo[6.2.1.1$^{3,6}$.0$^{2,7}$]dodec - 9 - en-4-ylenthanol (which results from the Diels-Alder synthesis of 2 mols of cyclopentadiene and one mol of 1-buten-4-ol), maintained at about 50° C. with stirring, there is added, dropwise, 260 grams of a 25.5 weight percent solution of peracetic acid in ethyl acetate over a period of 2 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo [6.3.1.1$^{3,6}$.0$^{2,7}$.0$^{9,11}$]tridec-4-ylethanol by inspection of its infrared absorption spectrum.

EXAMPLE 19

The compound, tetracyclo[6.2.1.1$^{3,6}$.0$^{2,7}$]dodec-9-en-4-ol (melting point of 87°–88° C.), is prepared by the saponification of the reaction product obtained by the Diels-Alder synthesis of 2 mols of cyclopentadiene with one mol of vinyl acetate. To 88 grams of tetracyclo[6.2.1.1$^{3,6}$.0$^{2,7}$] dodec-9-en-4-ol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 176 grams. Then the resulting reaction product mixture is cooled, followed by neutralizing the catalyst with acetic acid. The reaction product mixture is washed with aqueous solution of sodium chloride, and then washed with water. The product, a mixture of tetracyclo[6.2.1.1$^{3,6}$.0$^{2,7}$]dodec - 9 - en-4-oxy (polyethyleneoxy)ethanols, is dried at an elevated temperature under reduced pressure.

EXAMPLE 20

To a reaction vessel which contains 200 grams of ethyl acetate and 200 grams of the mixture of tetracyclo[6.2.1.1$^{3,6}$.0$^{2,7}$]dodec - 9 - en - 4 - oxy(polyethyleneoxy)ethanols which is prepared as explained in Example 19 supra and maintained at about 30° C. with stirring, there is added, dropwise, 350 grams of a 26.2 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as a mixture of 10-oxapentacyclo[6.3.1.1$^{3,6}$.0$^{2,7}$.0$^{9,11}$]tridec-4-oxy (polyethyleneoxy)ethanols.

EXAMPLE 21

To a reaction vessel which contains 160 grams of tricyclo[5.2.1.0$^{3,6}$.0$^{2,7}$.0$^{9,11}$]dec-3-en-8-ol, there is added 0.2 gram of potassium hydroxide, followed by heating the resulting admixture to about 120° C. with stirring. Ethylene oxide is fed into the stirred reaction mixture (below the liquid level) until the weight thereof increases by 240 grams. Then the resulting reaction product mixture is cooled, followed by neutralizing the catalyst with acetic acid. The reaction product mixture is washed with aqueous solution of sodium chloride, and then washed with water. The product, a mixture of tricyclo[5.2.1.0$^{2,6}$]dec-3-en-8-oxy(polyethyleneoxy)ethanols, is dried at an elevated temperature under reduced pressure.

EXAMPLE 22

To a reaction vessel which contains 250 grams of ethyl acetate and 300 grams of the mixture of tricyclo[5.2.1.0$^{2,6}$]dec-3-en-oxy(polyethyleneoxy)ethanols which is prepared as explained in Example 21 supra and maintained at about 40° C. with stirring, there is added, dropwise, 600 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product thus obtained is identified as a mixture of 4 - oxatetracyclo[6.2.1.0$^{2,6}$.0$^{3,5}$]undec - 9 - oxy(polyethyleneoxy)ethanols by inspection of its infrared absorption spectrum.

EXAMPLE 23

To a reaction vessel which contains 80 grams of tricyclo[5.2.1.0$^{2,6}$]dec-3-ene-8,9-diol, there is added 0.3 gram of potassium hydroxide, followed by heating the resulting admixture to about 120° C. with stirring. Ethylene oxide is fed into the stirred reaction mixture (below the liquid level) until the weight thereof increases by 330 grams. Then the resulting reaction product mixture is cooled, followed by neutralizing the catalyst with acetic acid. The reaction product mixture is washed twice with aqueous solution of sodium chloride, and then washed with water. The product, a mixture of tricyclo[5.2.1.0$^{2,6}$]dec-3-en-8,9-ylene-di[oxy(polyethyleneoxy)ethanols], is dried at an elevated temperature under reduced pressure.

EXAMPLE 24

To a reaction vessel which contains 110 grams of ethyl acetate and 110 grams of the mixture of tricyclo[5.2.1.0$^{2,6}$]dec - 3 - en-8,9-ylene-di[oxy(polyethyleneoxy)ethanols] which is prepared as explained in Example 23 supra and maintained at about 40° C. with stirring, there is added, dropwise, 400 grams of a 26.2 weight percent solution of peracetic acid in ethyl acetate over a period of 2.5 hours. After an additional 6 hours at about 40° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product, thus obtained, is identified as a mixture of 4-oxatetracyclo[6.2.1.0$^{2,6}$.0$^{3,5}$]undec - 9,10 - ylene-di[oxy(polyethyleneoxy)ethanols] by inspection of its infrared absorption spectrum.

EXAMPLE 25

To a reaction vessel which contains 50 grams of tetracyclo[6.2.1.1$^{3,6}$.0$^{2,7}$]dodec-9-ene-4,5-diol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 280 grams. Then the resulting reaction product mixture is cooled, followed by neutralizing the catalyst with acetic acid. The reaction product mixture is washed twice with aqueous solution of sodium chloride, and then washed with water. The product, a mixture of tetracyclo[6.2.1.1$^{3,6}$.0$^{2,7}$]dodec - 9 - en - 4,5-ylene-di[oxy(polyethyleneoxy)ethanols], is dried at an elevated temperature under reduced pressure.

EXAMPLE 26

To a reaction vessel which contains 80 grams of ethyl acetate and 80 grams of the mixture of tetracyclo-[6.2.1.1$^{3,6}$.0$^{2,7}$]dodec - 9 - en - 4,5 - ylene - di[oxy(polyethyleneoxy)ethanols] which is prepared as explained in Example 25 as supra and maintained at about 45° C. with stirring, there is added, dropwise, 300 grams of a 26.7 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as a mixture of 10-oxapentacyclo[6.3.1.1$^{3,6}$.0$^{2,7}$.0$^{9,11}$]tridec - 4,5 - ylene -di[oxy(polyethyleneoxy)ethanols] by inspection of its infrared absoprtion spectrum.

EXAMPLE 27

To 110 grams of the compound, tetracyclo[6.2.1.1$^{3,6}$.0$^{2,7}$]dodec - 9 - en - 4,5 - ylene - dimethanol (prepared via the Diels-Alder synthesis of 2 mols of cyclopentadiene with one mol of 2-butene-1,4-diol), there is added 0.2 gram of potassium hydroxide, followed by heating the resulting admixture to about 100°–120° C. with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec - 9 - en - 4,5-ylene-di(methyleneoxyethanol), is dried at an elevated temperature under reduced pressure.

EXAMPLE 28

To a reaction vessel which contains 70 grams of tetracyclo[6.2.1.1$^{3,6}$.0$^{2,7}$]dodec - 9 - en - 4,5-ylene-di(methyleneoxyethanol) maintained at about 30° C. with stirring, there is added dropwise, 300 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec-4,5-ylene-di(methyleneoxyethanol) by inspection of its infrared absorption spectrum.

EXAMPLE 29

To a reaction vessel which contains 80 grams of tricyclo[5.2.1.0$^{2,6}$]dec - 3 - en - 8,9 - ylene-di(oxyethanol) (prepared by heating 0.5 mol of tricyclo[5.2.1.0$^{2,6}$]dec-3-ene-8,9-diol with one mol of ethylene oxide in the presence of potassium hydroxide catalyst) maintained at about 30° C. with stirring, there is added, dropwise, 150 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylebenzene. The viscous liquid product, thus obtained, is identified as 4-oxatetracyclo[6.2.1.0$^{2,7}$.0$^{3,5}$]undec - 9,10 - ylene-di-(oxyethanol) by inspection of its infrared absorption spectrum.

EXAMPLE 30

A. To a reaction vessel which contains 60 grams of tricyclo[5.2.1.0$^{2,6}$]dec - 3 - en - 9,10 - ylene-di(oxyethanol), which results from the reaction of tricyclo[5.2.1.0$^{2,6}$]dec-3-ene-9,10-diol with two mols of ethylene oxide under the influence of heat and potassium hydroxide, maintained at about 30° C. with stirring, there is added, dropwise, 80 grams of a 24.8 weight percent solution of peracetic acid in ethyl acetate over a period of 2 hours. After an additional 5 hours at about 30° C., the reaction is essentially complete as indicated by a titration for peracetic acid. The volatile materials, i.e., ethyl acetate, acetic acid by-product, etc. are removed from the reaction product mixture by co-distillation with ethylbenzene. The viscous liquid product, thus obtained, is identified as 4 - oxatetracyclo[6.2.1.0$^{2,7}$.0$^{3,5}$]undec - 10,11 - ylene-di(oxyethanol) by inspection of its infrared absorption spectrum.

EXAMPLE 31

A. To a reaction vessel which contains 70 grams of tetracyclo[6.2.1.1$^{3,6}$.0$^{2,7}$]dodec - 9 - en - 4,5 - ylene - di(oxyethanol), which results from the potassium hydroxide-catalyzed reaction to two mols of ethylene oxide with tetracyclo[6.2.1.1$^{3,6}$.0$^{2,7}$]dodec - 9-ene-4,5-diol under the influence of heat, maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10 - oxapentacyclo[6.3.1.1$^{3,6}$.0$^{2,7}$.0$^{9,11}$]tridec - 4,5 - ylene - di(oxyethanol) by inspection of its infrared absorption spectrum.

EXAMPLE 32

To a reaction vessel which contains 50 grams of tetracyclo[6.2.1.1$^{3,6}$.0$^{2,7}$]dodec - 9 - en - 4,5 - ylene-di(methyleneoxyethanol) maintained at about 30° C. with stirring, (prepared by heating 0.5 mol of tetracyclo[6.2.1.1$^{3,6}$.0$^{2,7}$]dodec - 9 - en-4,5-ylene-dimethanol with one mol of ethylene oxide in the presence of potassium hydroxide catalyst) there is added, dropwise, 140 grams of a 25.2 weight percent solution of peracetic acid in ethyl acetate over a period of 2 hours. After an additional 4 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec - 4,5 - ylene - di(methyleneoxyethanol) by inspection of its infrared absorption spectrum.

EXAMPLE 33

To a reaction vessel contained in a bath there were added 75 grams of 4 - oxatetracyclo[6.2.1.0$^{2,7}$.0$^{3,5}$]undecan-9-ol, 35 grams of didecyl 4,5-epoxycyclohexane-1,2-dicarboxylate and 439 grams of dichloroethyl ether. The resulting mixture was cooled to 19° C., and a solution of 2.7 grams of boron trifluoride-etherate in 58.25 grams of dichloroethyl ether added dropwise. The mixture was allowed to warm to room temperature and thereafter to 49° C. over a period of 55 hours by controlling the temperature of the bath containing the reaction vessel. There was obtained 84 grams of a solid polymeric product which represened a conversion of 76.5 percent based on the theoretical value. The product had 7.025 percent hydroxyl groups by weight. The viscosity in dimethylformamide at 10 revolutions using a No. 4 spindle was found to be 1800 centipoises at 25° C. for a 50 weight percent solution.

To 50 grams of this solid polymeric product dissolved in 50 grams of tetrahydrofuran, there is added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 34

To a reaction vessel contained in a bath there were added 16 grams of 4-oxatetracyclo[6.2.1.0$^{2,7}$.0$^{3,5}$]undecan-9-ol, 4 grams of 3,4-epoxycyclohexanecarbonitrile, and 33 grams of di-chloroethyl ether. The resulting mixture was cooled to —10° to —15° C., and a solution of 0.5 gram of boron trifluoride-etherate in 3.5 grams of di-chloroethyl ether added dropwise. The mixture was allowed to warm to room temperature and thereafter to 33° C. over a 12 minute period by controlling the temperature of the bath containing the reaction vessel. There was obtained a viscous polymeric product which was recovered from the mixture.

To 10 grams of the polymeric product dissolved in 10 grams of tetrahydrofuran, there is added 15 grams of linseed oil acid and 10 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 35

To a reaction vessel contained in a bath there were added 16 grams of 4-oxatetracyclo[6.2.1.0$^{2,7}$.0$^{3,5}$]undecan-9-ol, 4-grams of 1,4-dichloro-2,3-epoxybutane and 32 grams of dichloroethyl ether. The resulting mixture was cooled to —20° C., and a solution of 0.5 gram of boron trifluoride-etherate in 4.5 grams of dichloroethyl ether, added dropwise. The mixture was allowed to warm to room temperature and then to 42° C. over a period of 14 minutes by controlling the temperature of the bath containing the reaction vessel. There was obtained 19 grams of a solid polymeric product.

To 10 grams of the polymeric product dissolved in 10 grams of tetrahydrofuran, there is added 15 grams of linseed oil acid and 10 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 36

To a reaction vessel contained in a bath there were added 64 grams of 4-oxatetracyclo[6.2.1.0$^{2,7}$.0$^{3,5}$]undecan-9-ol, 36 grams of epichlorohydrin and 33 grams of dioxane. The resulting mixture was cooled to 21° C., and a solution of 2.5 grams of boron trifluoride-etherate in 20 grams of dioxane, added dropwise. The mixture was allowed to warm to 47° C. over a period of about 19.5 hours by controlling the temperature of the bath containing the reaction vessel. There was obtained a viscous polymeric product which was separated from the mixture.

To 50 grams of the polymeric product dissolved in 50 grams of tetrahydrofuran, there is added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 37

To a reaction vessel contained in a bath there were added 75 grams of 4-oxatetracyclo[6.2.1.0$^{2,7}$.0$^{3,5}$]undecan-9-ol, 25 grams of propylene oxide and 46 grams of dioxane. The resulting mixture was cooled to 25° C., and a solution of 2.5 grams of boron trifluoride-etherate in 20 grams of dioxane added dropwise. The mixture was allowed to warm to 47° C. over a period of 3 hours by controlling the temperature of the bath containing the reaction vessel. A viscous polymeric solution was obtained. Thereafter 51 grams of dioxane were slowly added and the admixture maintained overnight at 40–50° C. At the end of 29 hours an additional 100 grams of dioxane were added. After precipitating in water, there was recovered a solid polymeric product.

To 50 grams of a solid polymeric product, there is added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 38

To a reaction vessel contained in a bath there were added 225 grams of 4-oxatetracyclo[6.2.1.0$^{2,7}$.0$^{3,5}$]undecan-9-ol, 75 grams of propylene oxide and 128 grams of dioxane. The resulting mixture was cooled to 23° C., and a solution of 10 grams of boron trifluoride-etherate in 60 grams of dioxane added dropwise. The mixture was allowed to warm to 46° C. over a period of 2.5 hours thereafter 52 milliliters of dioxane were slowly added and the admixture maintained overnight at 40–50° C. At the end of 26 hours an additional 252 grams of dioxane had been added to control the viscosity of the mixture. The polymeric product was precipitated in water, air dried overnight, and further dried in an oven at 60° C. The polymeric product had a melting point of 115–120° C. and represented 97.5 percent of the theoretical yield. The Brookfield viscosity using a No. 3 spindle at 50 revolutions per minute was 142 for a 50 weight percent.

To 50 grams of this solid polymeric product, there is added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 39

To a reaction vessel contained in a bath there were added 254 grams of 4-oxatetracyclo[6.2.1.0$^{2,7}$.0$^{3,5}$]undecan-9-ol, 46 grams of propylene oxide and 128 grams of dioxane. The resulting mixture was cooled to 17° C., and a solution of 10 grams of boron trifluoride-etherate in 34 grams of dioxane added dropwise. The mixture was allowed to warm to 43°–45° C. over a period of 23 hours by controlling the temperature of the bath containing the reaction vessel. During this period there was added an additional 157 grams of dioxane as the viscosity of the mixture increased. At the end of this period 273 grams of dioxane were added and the polymeric product caused to precipitate by the addition of water. After filtering and drying in a vacuum oven at 90–100° C. there was obtained 294 grams of a solid polymeric product having a melting point of 150–155° C. and a Brookfield viscosity of 294 centipoises in dimethylformamide using a No. 3 spindle and 50 revolutions per minute. The yield represented 98 percent of the theoretical value. The product had 8.5 hydroxyl groups by weight.

To 50 grams of this solid polymeric product dissolved in 50 grams of tetrahydrofuran, there are added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 40

To a reaction vessel contained in a bath there were added 67 grams of 4-oxatetracyclo[6.2.1.0$^{2,7}$.0$^{3,5}$]undecan-9-ol, 233 grams of propylene oxide and 75 grams of dioxane. The resulting mixture was cooled to 13° C., and a solution of 10 grams of boron trifluoride-etherate in 45 grams of dioxane added dropwise. The mixture was allowed to warm to 58° C. over a period of 27.5 hours by controlling the temperature of the bath containing the reaction vessel. At the end of this period 30 grams of super filtrol and 5 grams of water were added, the mixture filtered, and the filtrate stripped at 65° C. and a pressure of 5 millimeters of mercury. There was obtained 252 grams of a viscous polymeric product.

To 50 grams of the polymeric product contained in 50 grams of tetrahydrofuran, there are added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 41

To a reaction vessel contained in a bath, there were added 82 grams of 4-oxatetracyclo[6.2.1.0$^{2,7}$.0$^{3,5}$]undecan-9-ol, 18 grams of butylene oxide (mixed 1,2- and 2,3-isomers) and 33 grams of dioxane. The resulting mixture was cooled to 17° C., and a solution of 2.5 grams of boron trifluoride-etherate in 19 grams of dioxane added dropwise. The mixture was allowed to warm to room temperature and thereafter to 32° C. over a period of 27 hours by controlling the temperature of the bath containing the reaction vessel. During this period there were added an additional 35 grams of dioxane. At the end of the period a solid polymeric product was precipitated by the addition of water, filtered, and dried overnight in an oven at 70° C. There was obtained 97 grams of product having a melting point of 135–145° C. and 8.35 hydroxyl groups by weight.

To 50 grams of this solid polymeric product dissolved in 50 grams of tetrahydrofuran there are added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 42

To a reaction vessel contained in a bath there were added 73.5 grams of 4-oxatetracyclo[6.2.1.0$^{2,7}$.0$^{3,5}$]undecan-9-ol, 26.5 grams of styrene oxide and 33 grams of dioxane. The resulting mixture was cooled to 15° C., and a solution of 2.5 grams of boron trifluoride-etherate in 19 grams of dioxane added dropwise. The mixture was allowed to warm to 36° C. over a period of 5 hours by controlling the temperature of the bath containing the reaction vessel. During this period there were added an additional 35 grams of dioxane. At the end of the period the mixture was a solid polymeric product. After the addition of a large excess of dioxane and heating, the product was filtered and precipitated by the addition of water. After drying overnight at 70° C. there was obtained 80 grams of a polymeric product having a melting point of 145–155° C. and 8.04 hydroxyl groups by weight.

To 50 grams of this solid polymeric product dissolved in 50 grams of tetrahydrofuran, there are added 75 grams of linseed oil acid and 50 grams of xylene, followed by heating the resulting admixture to between about 240° and 260° C. for 6 hours during which period of time the excess solvent and water are removed therefrom. After this, the resulting varnish solution is cooled and diluted with xylene. A film cured in the manner set forth in the discussion preceding the operative examples is hard, clear, and tough.

EXAMPLE 43

In order to demonstrate the effect of the concentration of the epoxy alcohol and monoepoxide comonomer on the properties of the polymerized product, a comparison was made of the melting points of various polymers. It is evident from the data presented in Table I below that the products range from high melting solids to liquids depending upon the mole ratio of reactants:

TABLE I.—COPOLYMERS OF EPOXY ALCOHOL [1] AND PROPYLENE OXIDE

| Polymer Type | Percent Epoxy Alcohol by Weight | Mole Ratio [2] | Melting Point, °C. |
|---|---|---|---|
| Homopolymer | 100 | | 230–235 |
| Copolymer | 84.4 | 0.5 | 150–155 |
| Do | 75.0 | 1.05 | 120–125 |
| Do | 22.4 | 10.0 | Liquid |

[1] 4-oxatetracyclo[6.2.1.0$^{2,7}$.0$^{3,5}$]undecan-9-ol.
[2] Moles of propylene oxide to moles of epoxy alcohol.

TABLE II.—EVALUATION OF VARNISHES

| Ex. | Comonomer in Copolymer [1] | Impact (in.-lbs.) [2] | | 20% Sodium Hydroxide [3] | | Boiling Water [4] | | 1% Sulphuric [5] | | Sward Hardness |
|---|---|---|---|---|---|---|---|---|---|---|
| | | No Drier | Drier | No Drier | Drier | No Drier | Drier | No Drier | Drier | |
| 46 | Butylene oxide | (108), 1.5 mils | (108), .8 mils | Good | V. good | Exc | Exc | Good | Fair | 54 |
| 47 | Ethylene oxide Control | (108), 1.4 mils | (108), .8 mils | Poor | Fair | Good | Exc | do | Good | 64 |

[1] 4-oxatetracyclo[6.2.1.0$^{2,7}$.0$^{3,5}$]undecan-9-ol copolymerized with indicated comonomer.
[2] Film thickness is given with impact measurements. The test is more severe at 1.5 mils than at 0.8 mil, for example.
[3] The sodium hydroxide test is 24 hrs. at 25° C.
[4] The boiling water test is for one hr.
[5] The sulphuric acid test is 24 hrs. at 25° C.
[6] All films were baked 30 minutes at 350° F.
[7] The drier concentration was 0.01% cobalt metal and 0.5% lead metal.

EXAMPLE 44

To a 500 milliliter resin reaction flask equipped with a thermometer and contained in a water bath there were added 213 grams of dichloroethyl ether, the contents of the flask was then cooled to 20° C. A solution of 20 grams of dichloroethyl ether containing 2.5 percent by weight of boron trifluoride-etherate, and a separate mixture of 85 grams of 4-oxatetracyclo[6.2.1.0$^{2,7}$.0$^{3,5}$]undecan-9-ol and 15 grams of butylene oxide were both added dropwise to the flask over a period of approximately three hours. The mixture was maintained at a temperature of from 19°–23° C. over this period by controlling the temperature of the bath. At the end of the period there was obtained 78 grams of a solid polymeric product which was washed twice in acetone, filtered, and dried in an oven 2–3 hours at 70° C. The product obtained represented 78 percent of the theoretical value.

EXAMPLE 45

To a reaction vessel contained in a bath there were added 23.7 grams of 4-oxatetracyclo[6.2.1.0$^{2,7}$.0$^{3,5}$]undecan-9-ol, 63 grams of ethylene oxide and 100 grams of dioxane. The resulting mixture was cooled to 0° C., and a solution of 7.5 grams of boron trifluoride-etherate in 49 grams of dioxane added dropwise. The mixture was allowed to warm to approximately 42° C. over a period of 25 hours by controlling the temperature of the bath containing the reaction vessel. During this period there were added an additional 190 grams of dioxane. The product was filtered and precipitated by the addition of water. After drying overnight at 60° C. and 5 millimeters of pressure there was obtained a solid polymeric product.

EXAMPLES 46–47

Dehydrated castor oil acid ester varnishes were prepared from the copolymers of Examples 44 and 45, respectively, by heating at 185° C. enough dehydrated castor oil fatty acid to esterify 64 percent of the hydroxyl groups of the polyol. 0.1 percent octylene glycol titanite based on the weight of the reactants was used as an esterification catalyst. Xylene, 30–35 percent based on the weight of the reactants was used to aid in solution and to aid in the removal of water. The heating was continued for 5–6 hours or until the acid number was below 4.0, after which time the varnish was bodied at 250–260° C. for 30 to 45 minutes to improve the flow properties of the varnish. It was found that, in order to obtain varnishes with acceptable color, it is necessary to remove nearly all the residual boron trifluoride catalyst from the polyol. The solution polymers were neutralized with potassium hydroxide just prior to precipitation of the polymer in water. In the case of the suspension polymer, washing with 95 percent acetone-water was sufficient. Films with and without a drier were prepared on bonderite steel panels by conventional dipcoating techniques, air dried 15 minutes, and based at 350° F. for 30 minutes. In some cases it was necessary to air dry the films overnight to eliminate wrinkling of the film.

Preliminary evaluation show that the varnishes prepared from the copolymers have better flexibility and chemical properties almost equivalent to the varnishes prepared from the homopolymers. These results are listed in Table II along with the properties of a competitive bisphenol-epichlorohydrin condensate varnish.

Although the invention has been illustrated by the preceding examples, the invention is not to be construed as limited to the materials or conditions employed herein, but rather the invention encompasses the generic area as hereinbefore disclosed. Various modifications and embodiments of this invention can be made without departing from the spirit and scope thereof.

What is claimed is:
1. A fusible polyhydric copolymer of (A) at least one monoepoxide alcohol compound of the group consisting of

(a) 4-oxatetracyclo[6.2.1.0$^{2,7}$.0$^{3,5}$]undecan-9-ol,
(b) 4-oxatetracyclo[6.2.1.0$^{2,7}$.0$^{3,5}$]undec-9-oxyalkonal,
(c) 4-oxatetracyclo[6.2.1.0$^{2,7}$.0$^{3,5}$]undec-9-oxyalkanepolyol,
(d) 4-oxatetracyclo[6.2.1.0$^{2,7}$.0$^{3,5}$]undecane-9,10-diol,
(e) 4-oxatetracyclo[6.2.1.0$^{2,7}$.0$^{3,5}$]undecane-10,11-diol,
(f) 10-oxapentacyclo[6.3.1.1$^{3,6}$.0$^{2,7}$.0$^{9,11}$]tridecan-4-ol,
(g) 10-oxapentacyclo[6.3.1.1$^{3,6}$.0$^{2,7}$.0$^{9,11}$]tridecane-4,5-diol,
(h) 10-oxapentacyclo[6.3.1.1$^{3,6}$.0$^{2,7}$.0$^{9,11}$]tridec-4-ylalkanol,
(i) 10-oxapentacyclo[6.3.1.1$^{3,6}$.0$^{2,7}$.0$^{9,11}$]tridec-4,5-ylenedialkonal,
(j) 10-oxapentacyclo[6.3.1.1$^{3,6}$.0$^{2,7}$.0$^{9,11}$]tridec-4-oxyalkanol,
(k) 10-oxapentacyclo[6.3.1.1$^{3,6}$.0$^{2,7}$.0$^{9,11}$]tridec-4-oxyalkane-poly-ol,
(l) 10-oxapentacyclo[6.3.1.1$^{3,6}$.0$^{2,7}$.0$^{9,11}$]tridec-4-ylalkyleneoxyalkanol,
(m) 10-oxapentacyclo[6.3.1.1$^{3,6}$.0$^{2,7}$.0$^{9,11}$]tridec-4-ylmethyleneoxyalkane-poly-ol,
(n) the 4-oxatetracyclo[6.2.1.0$^{2,7}$.0$^{3,5}$]undec-9-oxy(mono- and polyalkyleneoxy)alkanols,
(o) the 4-oxatetracyclo[6.2.1.0$^{2,7}$.0$^{3,5}$]undec-9,10-ylene-di[oxy(mono- and polyalkyleneoxy)alkanols],
(p) the 4-oxatetracyclo[6.2.1.0$^{2,7}$.0$^{3,5}$]undec-10,11-ylene-di[oxy(mono- and polyalkyleneoxy)alkanols],
(q) the 10-oxapentacyclo[6.3.1.1$^{3,6}$.0$^{2,7}$.0$^{9,11}$]tridec-4-oxy(mono- and polyalkyleneoxy)alkanols,
(r) the 10-oxapentacyclo[6.3.1.1$^{3,6}$.0$^{2,7}$.0$^{9,11}$]tridec-4,5-ylene-di[oxy(mono- and polyalkyleneoxy)alkanols], (s) the 10 - oxapentacyclo[6.3.1.1³,⁶.0²,⁷.0⁹,¹¹]tridec-4-ylalkyleneoxy(mono- and polyalkyleneoxy)alkanols,
(t) 10 - oxapentacyclo[6.3.1.1³,⁶.0²,⁷.0⁹,¹¹]tridec - 4,5-ylene-di(alkyleneoxyalkanol), and
(u) the 10 - oxapentacyclo[6.3.1.1³,⁶.0²,⁷.0⁹,¹¹]tridec-4,5-ylene - di[alkyleneoxy(mono- and polyalkyleneoxy)alkanols];
(B) in copolymerized form with at least one monoepoxide of the formula

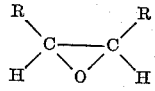

wherein each R is of the group consisting of hydrogen, alkyl, haloalkyl, aryl, and wherein both R's can form a six-membered cycloaliphatic ring; said polyhydric copolymer being characterized in that (1) it contains a plurality of alcoholic hydroxy groups, and (2) the copolymer chain of said polyhydric copolymer being formed by the reaction of an alcoholic hydroxy group with a vicinal epoxy group of the aforesaid monoepoxides.

2. The esterification reaction products obtained by reacting, at a temperature in the range of from about 100° C. to about 300° C., the polyhydric copolymer defined in claim 1, with an aliphatic monocarboxylic acid which contains at least 4 carbon atoms.

3. A fusible copolymer containing, in copolymerized form, 4-oxatetracyclo[6.2.1.0²,⁷.0³,⁵]undecan - 9 - ol and lower 1,2-alkylene oxide, said copolymer being characterized in that it contains a plurality of alcoholic hydroxy groups, the polymer chain of said copolymer being formed by the reaction of an alcoholic hydroxy group with a vicinal epoxy group of the aforesaid epoxide compounds.

4. The composition of claim 3 wherein said lower 1,2-alkylene oxide is propylene oxide.

5. The composition of claim 3 wherein said lower 1,2-alkylene oxide is butylene oxide.

6. The esterification reaction products obtained by reacting, at a temperature in the range of from about 100° C. to about 300° C., the copolymer defined in claim 3, with an ethylenically unsaturated monocarboxylic acid which contains at least 4 carbon atoms in amounts so as to provide from about 0.1 to 1.0 carboxy groups of said acid per hydroxy group of said copolymer.

7. The esterification reaction products of claim 6 wherein said ethylenically unsaturated monocarboxylic acid is an acid derived from a naturally occurring oil.

8. The esterification reaction products of claim 6 wherein said lower 1,2-alkylene oxide is propylene oxide.

9. The esterification reaction products of claim 6 wherein said lower 1,2-alkylene oxide is butylene oxide.

10. A fusible copolymer containing, in copolymerized form, 4 - oxatetracyclo[6.2.1.0²,⁷.0³,⁵]undecane-9-10-diol and lower 1,2-alkylene oxide, said copolymer being characterized in that it contains a plurality of alcoholic hydroxy groups, the polymer chain of said copolymer being formed by the reaction of an alcoholic hydroxy group with a vicinal epoxy group of the aforesaid epoxide compounds.

11. The esterification reaction products obtained by reacting, at a temperature in the range of from about 100° C. to about 300° C., the copolymer defined in claim 10, with an ethylenically unsaturated monocarboxylic acid which contains at least 4 carbon atoms in amounts so as to provide from about 0.1 to 1.0 carboxy groups of said acid per hydroxy group of said copolymer.

12. A fusible copolymer containing, in copolymerized form, 10-oxapentacyclo[6.3.1.1³,⁶.0²,⁷.0⁹,¹¹]tridecan - 4-ol and lower 1,2-alkylene oxide, said copolymer being characterized in that it contains a plurality of alcoholic hydroxy groups, the polymer chain of said copolymer being formed by the reaction of an alcoholic hydroxy group with a vicinal epoxy group of the aforesaid epoxide compounds.

13. The esterification reaction products obtained by reacting, at a temperature in the range of from about 100° C. to about 300° C., the copolymer defined in claim 12, with an ethylenically unsaturated monocarboxylic acid which contains at least 4 carbon atoms in amounts so as to provide from about 0.1 to 1.0 carboxy groups of said acid per hydroxy group of said copolymer.

14. The esterification reaction products obtained by reacting, at a temperature in the range of from about 100° C. to about 300° C., (A) an aliphatic monocarboxylic acid which contains at least about 4 carbon atoms, with (B) a fusible copolymer containing, in copolymerized form, 4-oxatetracyclo[6.2.1.0²,⁷.0³,⁵]undecan - 9-ol and lower 1,2-alkylene oxide, said copolymer being characterized in that it contains a plurality of alcoholic hydroxy groups, the polymer chain of said copolymer being formed by the reaction of an alcoholic hydroxy group with a vicinal epoxy group of the aforesaid epoxide compounds.

References Cited

UNITED STATES PATENTS

| | | | |
|---|---|---|---|
| 3,042,686 | 2/1962 | O'Brien et al. | 260—345 |
| 3,126,298 | 3/1964 | Patrick et al. | 260—2 |
| 3,231,586 | 1/1966 | Tinsley | 260—2 |
| 3,262,987 | 7/1966 | McGary et al. | 260—2 |
| 3,264,271 | 8/1966 | Porret et al. | 260—2 |
| 3,278,456 | 10/1966 | Starcher et al. | 260—18 |

FOREIGN PATENTS

| | | |
|---|---|---|
| 943,925 | 12/1963 | Great Britain. |
| 873,868 | 7/1961 | Great Britain. |

DONALD E. CZAJA, *Primary Examiner.*

LEON J. BERCOVITZ, *Examiner.*

C. W. IVY, *Assistant Examiner.*